US010931168B2

(12) United States Patent
Williams et al.

(10) Patent No.: US 10,931,168 B2
(45) Date of Patent: Feb. 23, 2021

(54) RADIAL-FLUX SHROUDED-FAN GENERATOR

(71) Applicant: WILLIAMS INTERNATIONAL CO., L.L.C., Pontiac, MI (US)

(72) Inventors: Gregg G. Williams, Pontiac, MI (US); Tristan M. Fletcher, Wixom, MI (US)

(73) Assignee: WILLIAMS INTERNATIONAL CO., L.L.C., Pontiac, MI (US)

( * ) Notice: Subject to any disclaimer, the term of this patent is extended or adjusted under 35 U.S.C. 154(b) by 139 days.

(21) Appl. No.: 16/367,110

(22) Filed: Mar. 27, 2019

(65) Prior Publication Data

US 2019/0319514 A1 Oct. 17, 2019

Related U.S. Application Data

(60) Provisional application No. 62/648,867, filed on Mar. 27, 2018.

(51) Int. Cl.
*H02K 7/18* (2006.01)
*H02K 1/27* (2006.01)
(Continued)

(52) U.S. Cl.
CPC .......... *H02K 7/1823* (2013.01); *F01D 15/10* (2013.01); *H02K 1/14* (2013.01); *H02K 1/27* (2013.01); *H02K 3/18* (2013.01); *H02K 3/521* (2013.01)

(58) Field of Classification Search
CPC .......... H02K 1/27; H02K 1/2786; H02K 1/14; H02K 1/28; H02K 3/18; H02K 3/521;
(Continued)

(56) References Cited

U.S. PATENT DOCUMENTS 4,861,237 A * 8/1989 Shiraki ............... F04D 25/0653
417/353
5,149,253 A * 9/1992 Miyamoto .......... F04D 13/0646
310/156.21
(Continued)

FOREIGN PATENT DOCUMENTS

EP 1031717 A2 8/2000

OTHER PUBLICATIONS

Unknown author, "Generator Basics", Internet document "2016-09-27-2-Generator-Basics-1.pdf" downloaded on Mar. 23, 2019, 34 pp., available from: http://www.electricalcontractorsdirectory.com/pdf/2016-09-27-2-Generator-Basics-1.pdf.

*Primary Examiner* — Tran N Nguyen
(74) *Attorney, Agent, or Firm* — Raggio & Dinnin, P.C.; Kurt L. VanVoorhies

(57) ABSTRACT

A shrouded bladed-rotor for use as a rotor of an electrical generator incorporates a plurality of blades and an annular magnetically-permeable yoke concentric with an associated axis of revolution. An even-numbered plurality of permanent magnets are operatively coupled to an outer surface of the annular magnetically-permeable rotor yoke, the latter of which comprises either a shroud of the shrouded bladed-rotor or a ring of magnetically-permeable material encircling the shroud. The North-South axis of each permanent magnet is substantially radially oriented with respect to the axis of rotation, and North-South orientations of every pair of circumferentially-adjacent permanent magnets of the plurality of permanent magnets are opposite to one another. A non-magnetic magnet-retaining-ring encircling the plurality of permanent magnets has sufficient hoop strength to retain the plurality of permanent magnets on the annular magnetically-permeable rotor yoke during intended operation of the electrical generator.

36 Claims, 16 Drawing Sheets

(51) Int. Cl.
*F01D 15/10* (2006.01)
*H02K 3/18* (2006.01)
*H02K 3/52* (2006.01)
*H02K 1/14* (2006.01)

(58) Field of Classification Search
CPC .......... H02K 7/00; H02K 7/18; H02K 7/1823; F01D 5/00; F01D 5/02; F01D 5/021; F01D 5/22; F01D 5/225; F01D 15/10; F02K 3/00; F02K 3/06
See application file for complete search history.

(56) References Cited

U.S. PATENT DOCUMENTS

| | | | |
|---|---|---|---|
| 5,986,379 A * | 11/1999 | Hollenbeck | H02K 1/145 310/216.038 |
| 6,895,741 B2 | 5/2005 | Rago et al. | |
| 7,622,817 B2 | 11/2009 | El-Refaie et al. | |
| 8,099,944 B2 | 1/2012 | Foster et al. | |
| 8,109,073 B2 | 2/2012 | Foster et al. | |
| 8,291,716 B2 | 10/2012 | Foster et al. | |
| 8,549,833 B2 | 10/2013 | Hyde et al. | |
| 8,596,036 B2 | 12/2013 | Hyde et al. | |
| 8,857,191 B2 | 10/2014 | Hyde et al. | |
| 9,148,040 B2 | 9/2015 | Anthony | |
| 9,190,892 B2 | 11/2015 | Anthony | |
| 2010/0108806 A1 | 5/2010 | Chan et al. | |
| 2012/0034083 A1* | 2/2012 | Shoji | F04D 25/0613 416/189 |
| 2018/0265206 A1 | 11/2018 | Himmelmann | |
| 2018/0334258 A1 | 11/2018 | Vondrell et al. | |
| 2018/0339780 A1 | 11/2018 | Barone et al. | |

\* cited by examiner

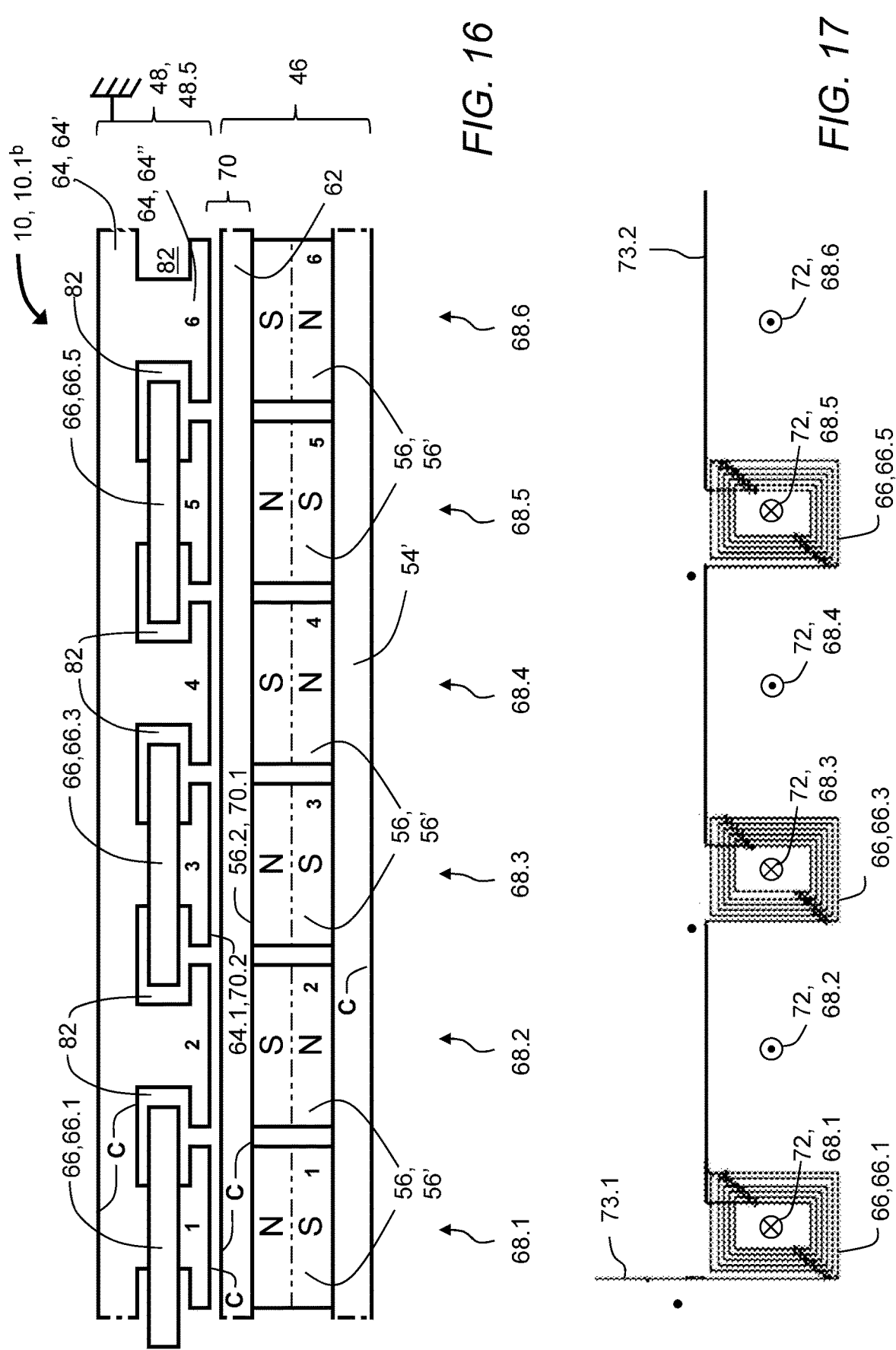

RADIAL-FLUX SHROUDED-FAN GENERATOR

CROSS-REFERENCE TO RELATED APPLICATIONS

The instant application claims the benefit of prior U.S. Provisional Application Ser. No. 62/648,867 filed on 27 Mar. 2018, which is incorporated herein by reference in its entirety.

BRIEF DESCRIPTION OF THE DRAWINGS

In the accompanying drawings:

FIG. 16 illustrates a schematic 360-degree developed side view of rotor and stator portions of a second embodiment of a single-phase shrouded-fan generator—viewed from the front of the associated turbofan gas-turbine engine—incorporating a fifth aspect of an associated stator portion that provides for generating a single-phase AC output;

FIG. 17 illustrates a plurality of stator coils connected in series, wherein each of the stator coils is incorporated in the fifth-aspect stator portion illustrated in FIG. 16;

DESCRIPTION OF EMBODIMENT(S)

Figures 1, 2:
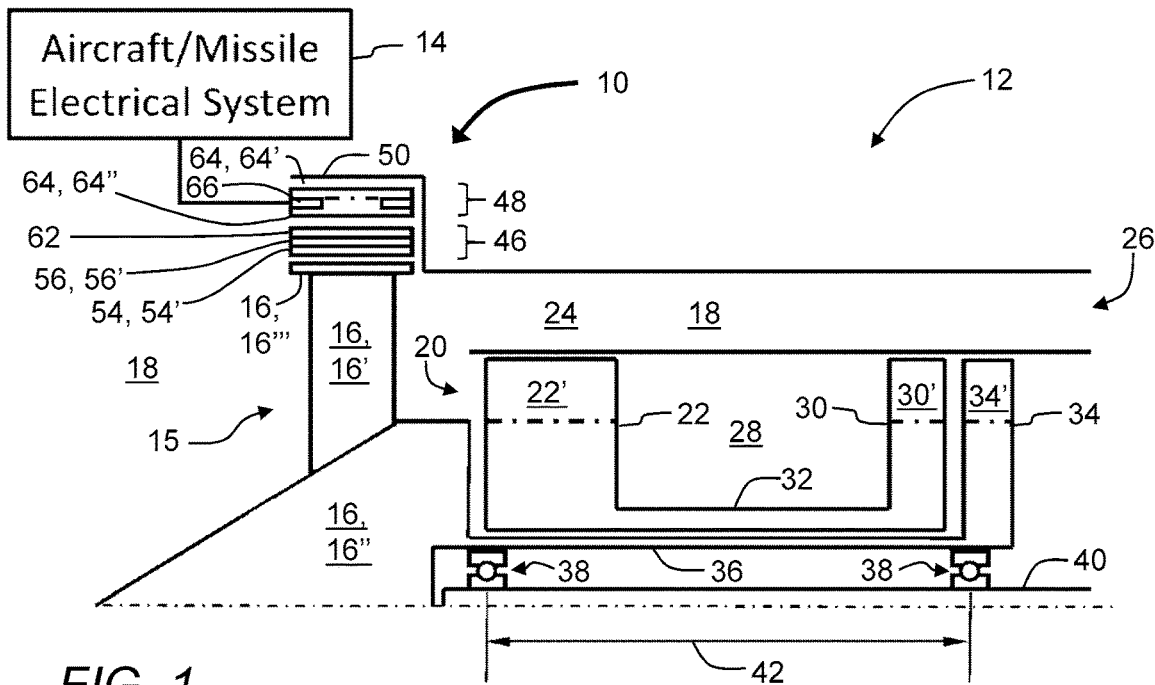
FIG. 1 illustrates a schematic cross-sectional view of a turbofan gas-turbine engine incorporating a shrouded-fan generator that supplies electrical power to an associated aircraft or missile electrical system.
FIG. 2 illustrates a first fragmentary cross-sectional view of an inlet portion of a turbofan gas-turbine engine incorporating a first aspect of a shrouded-fan generator.

Referring to FIG. 1, a shrouded-fan generator 10—also referred to as a fan-tip generator—incorporated in a turbofan gas-turbine engine 12 provides for generating electrical power for an electrical system 14 of an aircraft or missile (not illustrated) propelled by the turbofan gas-turbine engine 12. The shrouded-fan generator 10 cooperates with an associated inlet fan 15 that is configured as a shrouded fan 16 that, in operation, pumps air 18 both into the inlet 20 of a compressor 22, and into a bypass duct 24, the latter of which exhausts at an associated bypass outlet 26 to provide for generating a portion of the thrust from the turbofan gas-turbine engine 12. Air 18 compressed by the blades 22' of the compressor 22 is directed into a combustion chamber 28 of the turbofan gas-turbine engine 12 to combine with, and combust, fuel that is also injected therein, and the exhaust therefrom drives a high-pressure turbine 30 by interaction with the blades 30' thereof. The compressor 22 and high-pressure turbine 30 are connected together as an associated high-pressure spool 32 of the turbofan gas-turbine engine 12, which provides for the high-pressure turbine 30 to drive the compressor 22. The exhaust gases exiting the high-pressure turbine 30 then drive the blades 34' of a low-pressure turbine 34 that is connected to the shrouded fan 16 via an associated low-pressure spool 36, which provides for the low-pressure turbine 34 to drive the shrouded fan 16. The low-pressure spool 36 is supported by a pair of rolling-element bearings 38 depending from a low-pressure shaft 40 and separated by an associated bearing span distance 42.

Figure 3:
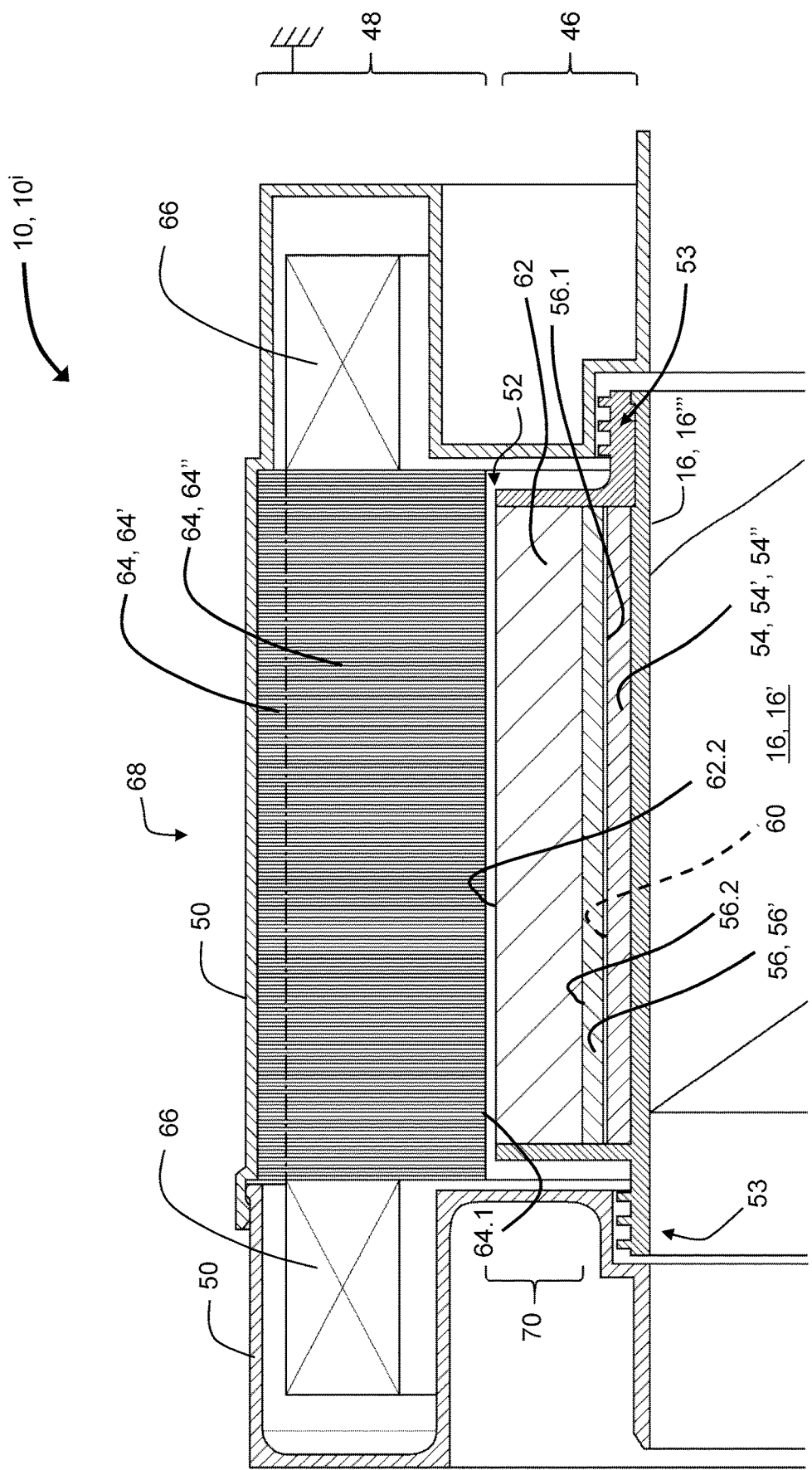
FIG. 3 illustrates an expanded second fragmentary cross-sectional view of a portion of FIG. 2 illustrating the associated first-aspect shrouded-fan generator.
Figure 4:
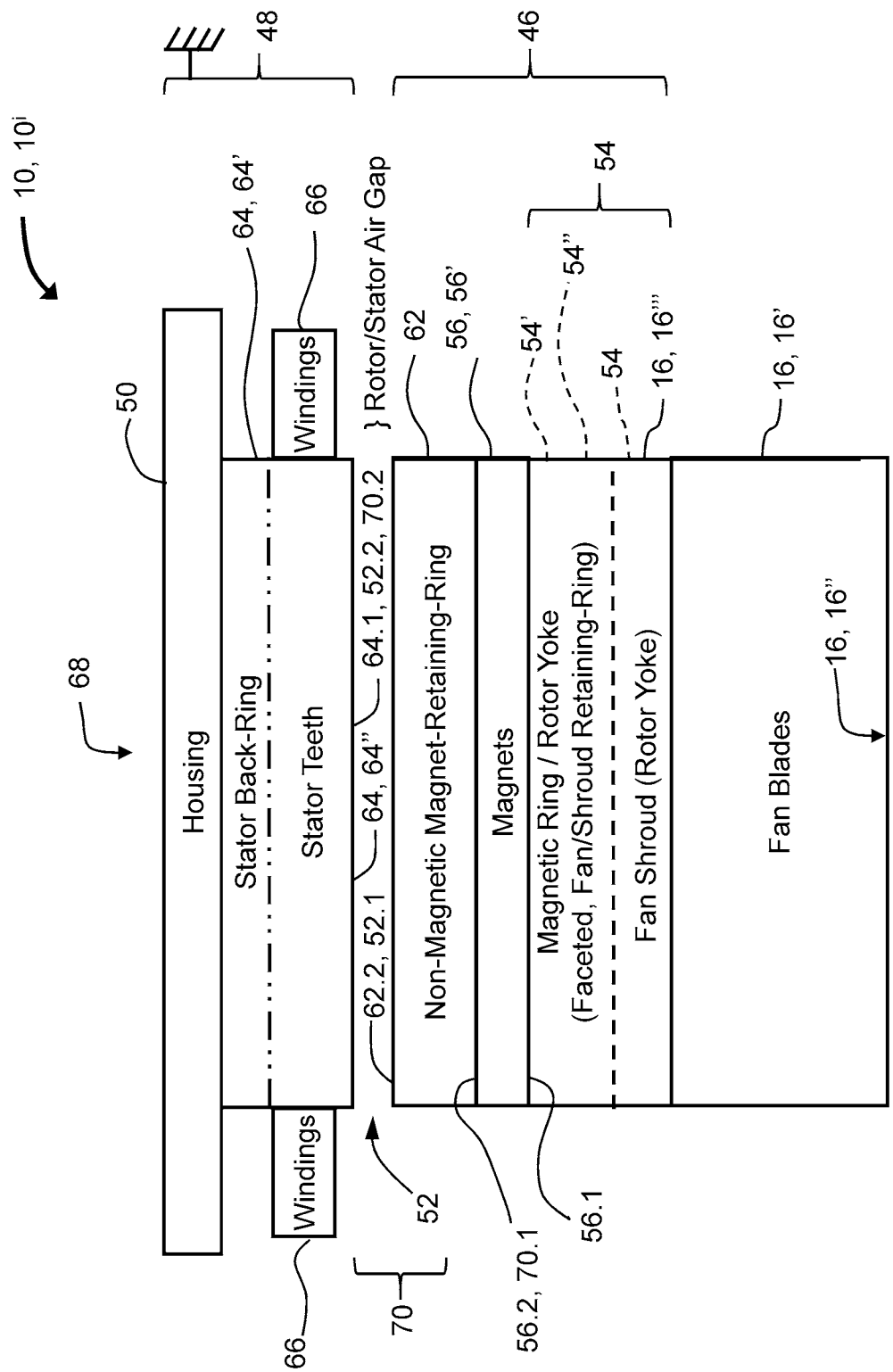
FIG. 4 illustrates a block diagram of the elements of the first-aspect shrouded-fan generator illustrated in FIG. 3.

Referring also to FIGS. 2-4, the shrouded fan 16 comprises a plurality of fan blades 16' that radially extend within an annular region 44 between a central hub 16" and a fan shroud 16'" connecting the fan tips—i.e. the tips of the fan blades 16'—to one another, wherein the fan shroud 16'" comprises a cylindrical-hoop shell that is attached—for example, in one set of embodiments, integrally attached—to the radially-outermost portions of the fan blades 16'. The central hub 16" is either operatively coupled to, or integral with, the low-pressure spool 36, and air 18 pumped by the shrouded fan 16 flows through the annular region 44 thereof responsive to the action of the rotating fan blades 16'. In one set of embodiments, the forward end of the central hub 16" is terminated with a nose cone 45. For example, in one set of embodiments, the shrouded fan 16 is constructed of aluminum, steel or a titanium alloy in order to withstand the possible stresses and temperatures during operation of the turbofan gas-turbine engine 12. The shrouded fan 16 could be either integrally constructed of a single piece of material, or constructed of separated pieces that are connected together, for example, with separate blade portions that are dovetailed into the central hub 16", each of which blade portions might incorporate a circumferential segment of the fan shroud 16'" that circumferentially abut one another when the blade portions are assembled to the central hub 16", so as to constitute the complete fan shroud 16'" when fully assembled. Alternatively, the individual fan blades 16' could be first assembled onto the central hub 16", followed by shrinking a metal hoop fan shroud 16'" over the tips of the fan blades 16'.

Referring to FIG. 4, in accordance with a first aspect 10, $10^i$, a shrouded-fan generator 10, $10^i$ comprises a rotatable rotor portion 46 operatively coupled to, and around, the fan shroud 16'" of the shrouded fan 16, and further comprises a stationary stator portion 48 that is operatively coupled to a fan casing 50 that is part of the inlet housing and front bearing support structure of the turbofan gas-turbine engine 12, wherein the rotor 46 and stator 48 portions are separated from one another by a relatively-small, annular physical rotor/stator airgap 52. In one set of embodiments, the rotor portion 46 incorporates a set of labyrinth seals 53 (illustrated in FIGS. 2 and 3) that are operative between the rotor portion 46 and the fan casing 50 to provide for at least partially isolating the stator portion 48 from the air flow path of the shrouded fan 16. The rotor portion 46 incorporates a magnetically-permeable rotor yoke 54, which may comprise either the fan shroud 16'" alone if constructed of a magnetically-permeable material, a combination of a magnetically-permeable fan shroud 16'" with a separate annular magnetically-permeable ring 54' encircling the fan shroud 16'", or a magnetically-permeable ring 54' alone—encircling the fan shroud 16'"—if the fan shroud 16'" is constructed of a non-magnetic material. For relatively high speed embodiments for which the fan shroud 16'" does not have sufficient hoop strength to safely retain the associated fan blades 16' at the anticipate operating speed, the magnetically-permeable rotor yoke 54 may comprise a magnetically-permeable fan-retaining-ring 54' with sufficient hoop strength to do so.

Accordingly, in accordance with one set of embodiments, the rotor portion 46 of the shrouded-fan generator 10, $10^i$ comprises an annular magnetically-permeable fan-retaining-ring 54'—which also serves as an annular, magnetically-permeable rotor yoke 54—that is shrunk onto the outside cylindrical surface of the fan shroud 16'" for a configuration in which the fan shroud 16'" operates at relatively-high surface speeds with associated relatively-high centrifugal acceleration that results in relatively high hoop stress in the fan shroud 16'" and/or the magnetically-permeable fan-retaining-ring 54, 54', 54". Accordingly, in one set of embodiments, the magnetically-permeable fan-retaining-ring 54, 54', 54" is constructed of a ring of relatively-high-strength relatively-highly-magnetically-permeable steel, for example, either 4140-alloy steel or 4340-alloy steel. For example, in one set of embodiments, the fan shroud 16'" and magnetically-permeable fan-retaining-ring 54, 54', 54" operate at a circumferential-surface speed in the range of 270 to 430 meters/second (900 to 1,400 feet/second). The associated resulting relatively-high surface speeds provide for a relatively small shrouded-fan generator 10, $10^i$ to generate a relatively-large amount of electrical power. Alternatively, the fan shroud 16'" could be constructed of a relatively-high-strength relatively-highly-magnetically-permeable steel, for example, either 4140-alloy steel or 4340-alloy steel, so as to preclude the need for a separate magnetically-permeable fan-retaining-ring 54. Accordingly, hereinafter, reference to the magnetically-permeable rotor yoke 54 is intended to mean a reference either to the magnetically-permeable ring 54, 54', magnetically-permeable fan-retaining-ring 54, 54', 54", or to the fan shroud 16'" alone if configured as a magnetically-permeable rotor yoke 54, or the combination of both if both a magnetically-permeable ring 54, 54' or magnetically-permeable fan-retaining-ring 54, 54', 54" and the fan shroud 16'" are each constructed of a relatively-highly-magnetically-permeable material.

Figure 5:
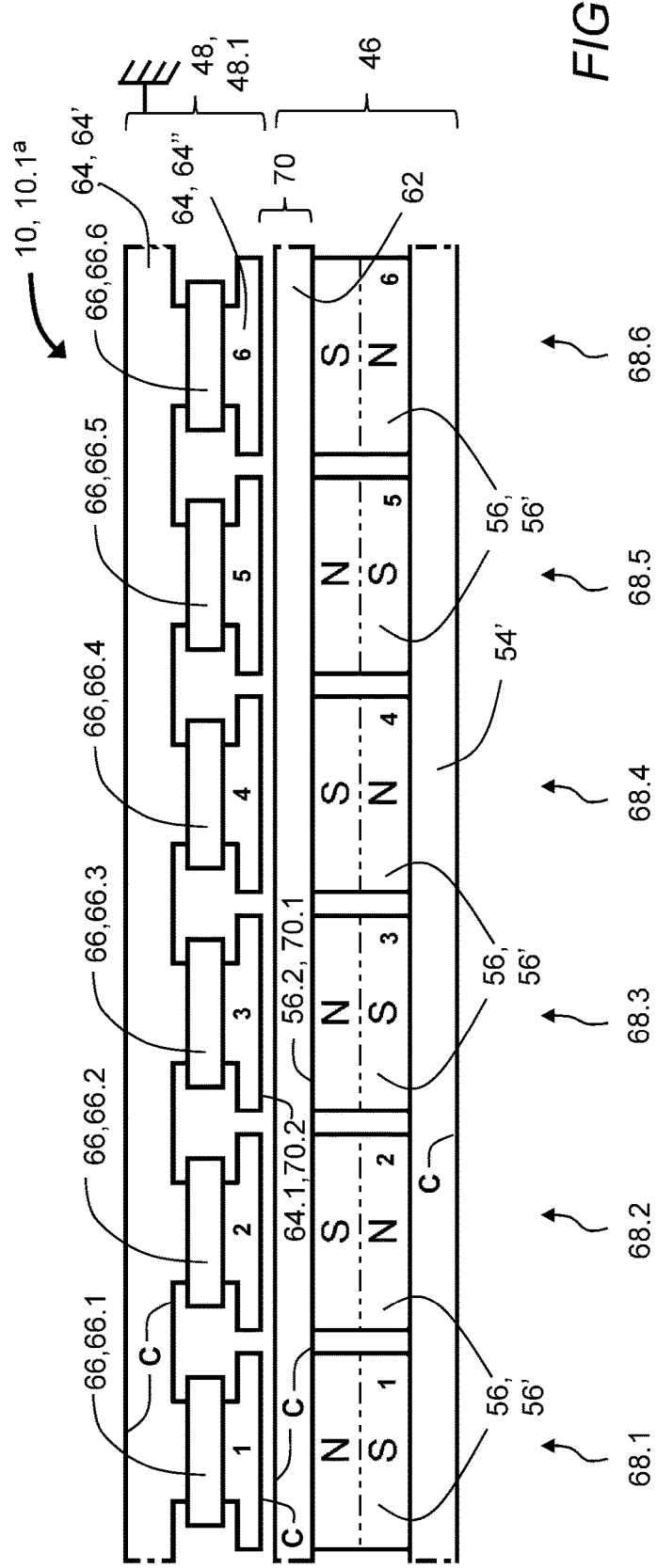
FIG. 5 illustrates a schematic 360-degree developed side view of rotor and stator portions of a first embodiment of a single-phase shrouded-fan generator—viewed from the front of the associated turbofan gas-turbine engine—incorporating a first aspect of an associated stator portion that provides for generating a single-phase AC output.
Figure 6:
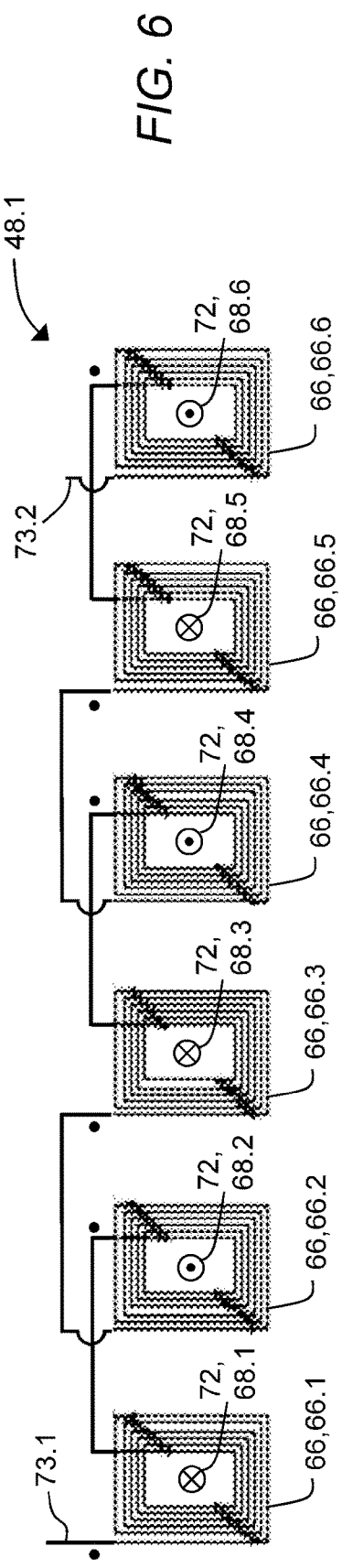
FIG. 6 illustrates a plurality of stator coils connected in series, wherein each of the stator coils is incorporated in the first-aspect stator portion illustrated in FIG. 5.

Referring also to FIGS. 5 and 6—illustrating 360-degree developed views of the rotor 46 and stator 48 portions of the shrouded-fan generator 10, $10^i$, transformed from a circular to a linear representation, with each of the representative horizontal lines or line segments therein designated with a "C" corresponding to a cylindrical profile in the shrouded-fan generator 10, $10^i$—the rotor portion 46 of the shrouded-fan generator 10, $10^i$ further comprises an even plurality of radial-flux permanent magnets 56 attached to the outside of the magnetically-permeable rotor yoke 54 with equiangular spacing relative to the rotational axis 58 of the shrouded fan 16, with the N-S axis of each radially-oriented, but with circumferentially-adjacent permanent magnets 56 having relatively-opposite magnetic polarity, i.e. with the North (N) and South (S) poles reversed with respect to one another, as described more-fully hereinbelow. For example, in one set of embodiments, the outside surface of the magnetically-permeable rotor yoke 54 is faceted with a plurality of equiangularly-spaced planar facets 60 adapted to receive corresponding permanent magnets 56 having flat inboard surfaces 56.1. Alternatively, for a magnetically-permeable rotor yoke 54 having a cylindrical outer surface, the inboard surfaces 56.1 of the permanent magnets 56, 56' may be formed or ground to match the curvature of the magnetically-permeable rotor yoke 54. In one set of embodiments, the permanent magnets 56 are rare-earth permanent magnets 56' having a relatively-high energy product and with a relatively-high Curie temperature, for example, in one set of embodiments, constructed of either a Samarium-Cobalt (Sm—Co) or a Neodymium-Iron-Boron (N—I—B) material. The plurality of permanent magnets 56, 56' are retained on the magnetically-permeable rotor yoke 54 by a non-magnetic magnet-retaining-ring 62. In one set of embodiments, the outboard surfaces 56.2 of the permanent magnets 56, 56' are formed or ground so that the composite of the plurality of permanent magnets 56, 56' has cylindrical curvature so as to provide for accommodating the non-magnetic magnet-retaining-ring 62 without diminishing the hoop strength thereof, the latter of which provides sufficient hoop strength to retain the permanent magnets 56, 56' when the latter are subjected to relatively high centrifugal forces at the relatively-high rotational and associated surface speeds during operation of the turbofan gas-turbine engine 12 at the associated operating temperature thereof. For example, in one set of embodiments, the non-magnetic magnet-retaining-ring 62 is constructed of a composite material with a relatively-high strength-to-weight ratio, for example—but not limited to—a composite ring made of carbon fiber and epoxy resin, with the composite ring installed around the magnetically-permeable rotor yoke 54 after attaching the permanent magnets 56, 56' thereto. For example, in some embodiments, such a composite non-magnetic magnet-retaining-ring 62 may be constructed with sufficiently high strength to enable the non-magnetic magnet-retaining-ring 62 to resist the centrifugal forces from the permanent magnets 56, 56' and the fan shroud 16''', and at least a portion thereof from the fan blades 16'. Accordingly, the relatively high strength non-magnetic magnet-retaining-ring 62 can provide for using a relatively-lower-cost material to form the fan blades 16' than might otherwise be required without the non-magnetic magnet-retaining-ring 62.

A carbon-fiber-epoxy composite might have an upper-operating-temperature threshold of about 260 degrees Celsius (500 degrees Fahrenheit). For embodiments requiring a higher upper-operating-temperature threshold, the non-magnetic magnet-retaining-ring 62 could be constructed of Inconel® 718 or titanium. During operation of the turbofan gas-turbine engine 12, even though the operating temperature of the shrouded fan 16 is relatively cool compared with other portions of the turbofan gas-turbine engine 12 downstream therefrom, the shrouded fan 16 does experience heating from relatively-hot ram-inlet air, from windage, and from heat transfer by radiation and conduction from hotter portions of the turbofan gas-turbine engine 12, and the materials from which the shrouded-fan generator 10, 10$^i$ is constructed are selected to withstand the expected thermal environment.

In accordance with one set of embodiments, the stator portion 48 of the shrouded-fan generator 10, 10$^i$ comprises a magnetically-permeable laminated stator core 64 comprising a continuous stator back-ring portion 64' from which depend—radially-inward therefrom—a plurality of stator teeth 64" around which are wound corresponding stator windings/coils 66. For example, in one set of embodiments, the laminations of the laminated stator core 64 are constructed of a relatively-highly-magnetically-permeable material capable of operation at the relatively-high temperatures to which the laminated stator core 64 is exposed during operation of the turbofan gas-turbine engine 12, for example, a 3% silicon steel, for example, with inter-laminar surface coatings or treatments to mitigate against eddy-current conduction between adjacent laminar layers, wherein for an laminated stator core 64 comprising iron, the stator back-ring portion 64' may also be referred to as a stator back-iron portion 64'.

Each of the permanent magnets 56, 56' defines a corresponding pole 68 of the shrouded-fan generator 10, 10'. In one set of embodiments, the outboard surfaces 56.2 of each of the permanent magnets 56, 56' conform to an underlying first cylindrical surface—centered about the rotational axis 58 of the shrouded fan 16—that defines an inboard boundary 70.1 of an effective airgap 70 of the associated magnetic circuit of the shrouded-fan generator 10, 10$^i$. The outboard surface 62.2 of the non-magnetic magnet-retaining-ring 62 conforms to an underlying second cylindrical surface—concentric with the first cylindrical surface—that defines an inboard boundary 52.1 of the physical rotor/stator airgap 52. The inboard surface 64.1 of the laminated stator core 64 conforms to an underlying third cylindrical surface—concentric with the first and second cylindrical surfaces—that defines both an outboard boundary 70.2 of the effective airgap 70 and an outboard boundary 52.2 of the physical rotor/stator airgap 52. The effective airgap 70 is the radial thickness of the non-magnetic region between the outboard surfaces 56.2 of the permanent magnets 56, 56' and the inboard surface 64.1 of the laminated stator core 64, which includes both the physical rotor/stator airgap 52 and the radial thickness of the non-magnetic magnet-retaining-ring 62 beyond the outboard surfaces 56.2 of the permanent magnets 56, 56'. In one set of embodiments, given the packaging constraints of the turbofan gas-turbine engine 12, the radial length (i.e. thickness) of the permanent magnets 56, 56' is less than the length of the effective airgap 70. Although the power-generating capacity of a radial permanent-magnet generator is typically directly related to the ratio of the length (i.e. radial length along N-S axis) of the associated permanent magnets 56, 56' to the length (i.e. radial length) of the associated effective airgap 70—and also proportional to the transverse area of the permanent magnets 56, 56' (i.e. transverse to the N-S axis),—the shrouded-fan generator 10, 10$^i$ of the turbofan gas-turbine engine 12 operates at sufficiently high circumferential surface speeds (i.e. surface speed=radius times radian rotational velocity) to offset an otherwise limiting effect of the relatively large effective airgap 70 in relation to the radial length of the permanent magnets 56, 56', and to provide sufficient power for the electrical system 14 of the associated aircraft or missile. In one set of embodiments, the radial length of the effective airgap 70 is from 1 to 10 times—for example, in one embodiment, about 9 times—the radial length of each permanent magnet 56, 56'. Also, in one set of embodiments, each permanent magnet 56, 56' is between 1 and 2 inches (25 and 51 millimeters) in lateral dimension. For a given circumferential magnet size, the maximum number of permanent magnets 56, 56' is dependent upon the diameter of the fan shroud 16''', wherein a relatively-larger-diameter fan shroud 16''' would typically incorporate a larger number permanent magnets 56, 56', but would typically also rotate more slowly during operation of the turbofan gas-turbine engine 12, than would a relatively-smaller-diameter fan shroud 16''', for the same level of peripheral velocity that might be chosen to limit hoop stress in the fan shroud 16''', the magnetically-permeable ring 54', the magnetically-permeable fan-retaining-ring 54''', or the non-magnetic magnet-retaining-ring 62 of the shrouded-fan generator 10, 10$^i$.

Referring to FIGS. 5-15c, the stator portion 48 of the shrouded-fan generator 10 can be adapted to produce either a single-phase AC output, or a multi-phase AC output, that can be subsequently rectified, converted or regulated to fulfill the power requirements of the electrical system 14 of the associated aircraft or missile.

For example, referring to FIGS. 5-7d, a first embodiment of a single-phase shrouded-fan generator 10, 10.1$^a$, incorporating a corresponding first aspect of an associated stator portion 48.1 that provides for generating a single-phase AC output, comprises a plurality of six permanent magnets 56, 56' (labeled "1" through "6") on the outside of an annular-cylindrical magnetically-permeable rotor yoke 54—the latter of which may have planar facets 60 to accommodate permanent magnets 56, 56' having corresponding flat inboard surfaces 56.1—and further comprises a laminated stator core 64 with a corresponding plurality of six stator teeth 64" (labeled "1" through "6"), each having a corresponding stator winding/coil 66, 66.1, 66.2, 66.3, 66.4, 66.5, 66.6 wound thereabout. Referring to FIG. 6, in one embodiment, the six stator windings/coils 66, 66.1, 66.2, 66.3, 66.4, 66.5, 66.6 are connected in series with one another for maximum combined AC peak-to-peak output voltage, wherein, in accordance with Lenz's Law, for each stator winding/coil 66, 66.1, 66.2, 66.3, 66.4, 66.5, 66.6, the terminal indicated by the dot "●" is relatively positive with respect to the counterpart undotted terminal responsive to a magnetic flux 72 that is increasing in magnitude in the indicated flux direction—with the "arrow-tail" symbol indicating flux directed into the page, and the "arrow-point" symbol indicating flux emanating out of the page,—for example, for the illustrated point in time, from the stator back-ring portion 64' to stator tooth 64" for every other stator winding/coil 66, 66.1, 66.3, 66.5, and from stator tooth 64" to stator back-ring portion 64' for the remaining stator windings/coils 66, 66.2, 66.4, 66.6, wherein the direction of the N-S polarities of each pair of circumferentially-adjacent permanent magnets 56, 56' is reversed with respect to one another. The AC output of the embodiment of the series stator windings/coils 66, 66.1, 66.2, 66.3, 66.4, 66.5, 66.6 illustrated in FIG. 6 is generated between associated terminals 73.1, 73.2 of the associated series network, i.e. respectively, the dotted "●" terminal of the first stator winding/coil 66, 66.1 and the undotted terminal of the sixth stator winding/coil 66, 66.6. The direction of N-S polarization of the odd-numbered permanent magnets 56, 56' ("1", "3", "5") in FIG. 5 is the same, but is reversed relative to the direction of N-S polarization of the even-numbered permanent magnets 56, 56' ("2", "4", "6") in FIG. 5. Each of the associated permanent magnets 56, 56' ("1", "2", "3", "4", "5", "6") defines a corresponding pole 68, 68.1, 68.2, 68.3, 68.4, 68.5, 68.6 of the illustrated embodiment of the first-embodiment-single-phase shrouded-fan generator 10, 10.1$^a$.

Figure 7A:
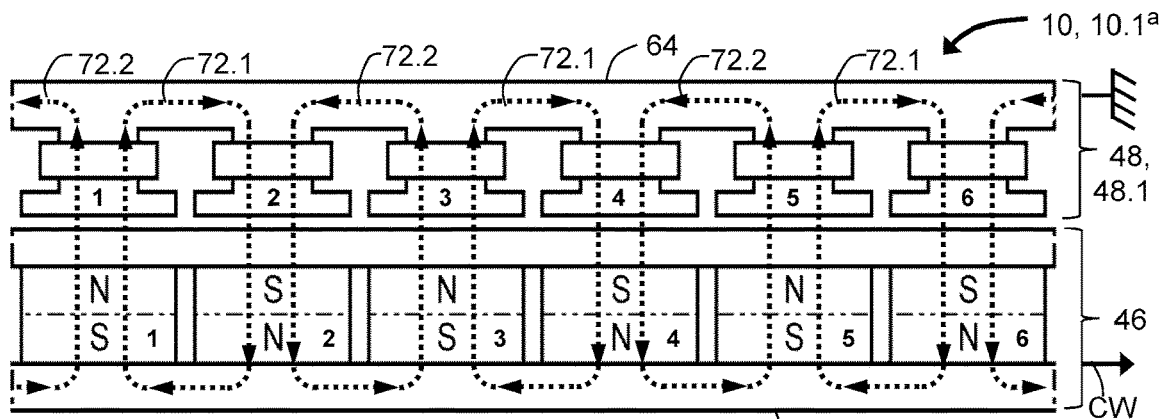
FIGS. 7a-7d respectively illustrate 360-degree developed side views of rotor and stator portions of the first-aspect stator portion in FIG. 5, for successive relative-rotational positions of the rotor and stator portions associated with a single cycle of an associated AC output waveform from the coils of the first aspect shrouded-fan generator.
Figure 7B:
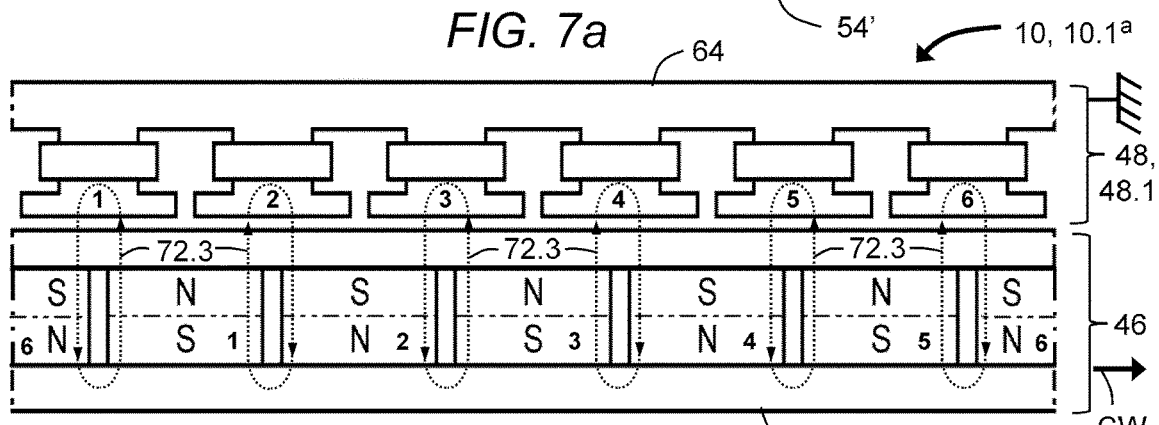
Figure 7C:
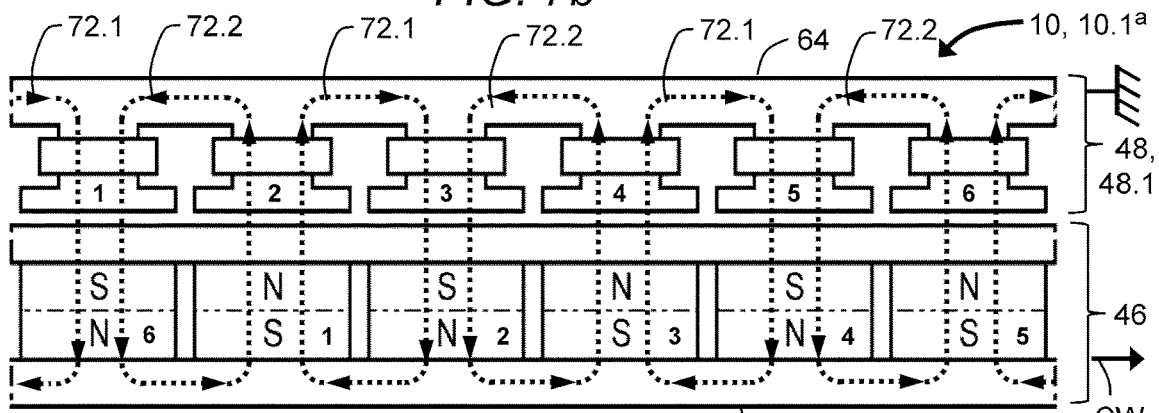
Figure 7D:
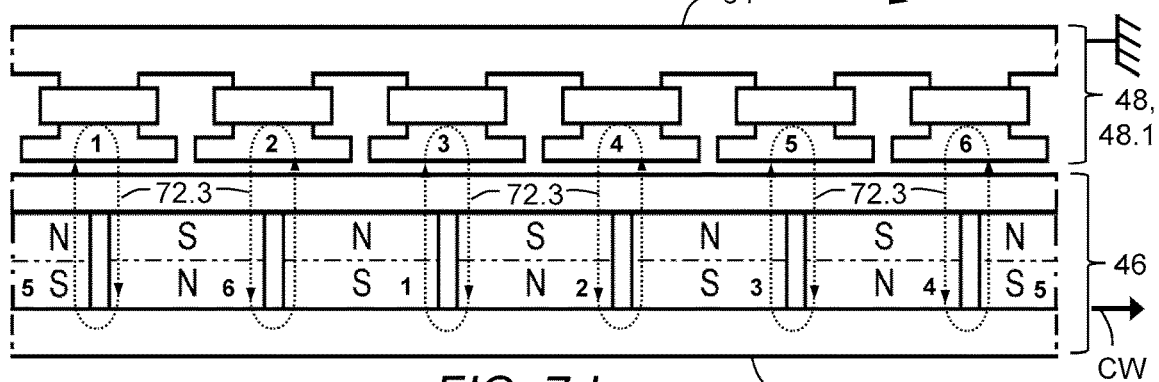
Figure 8:
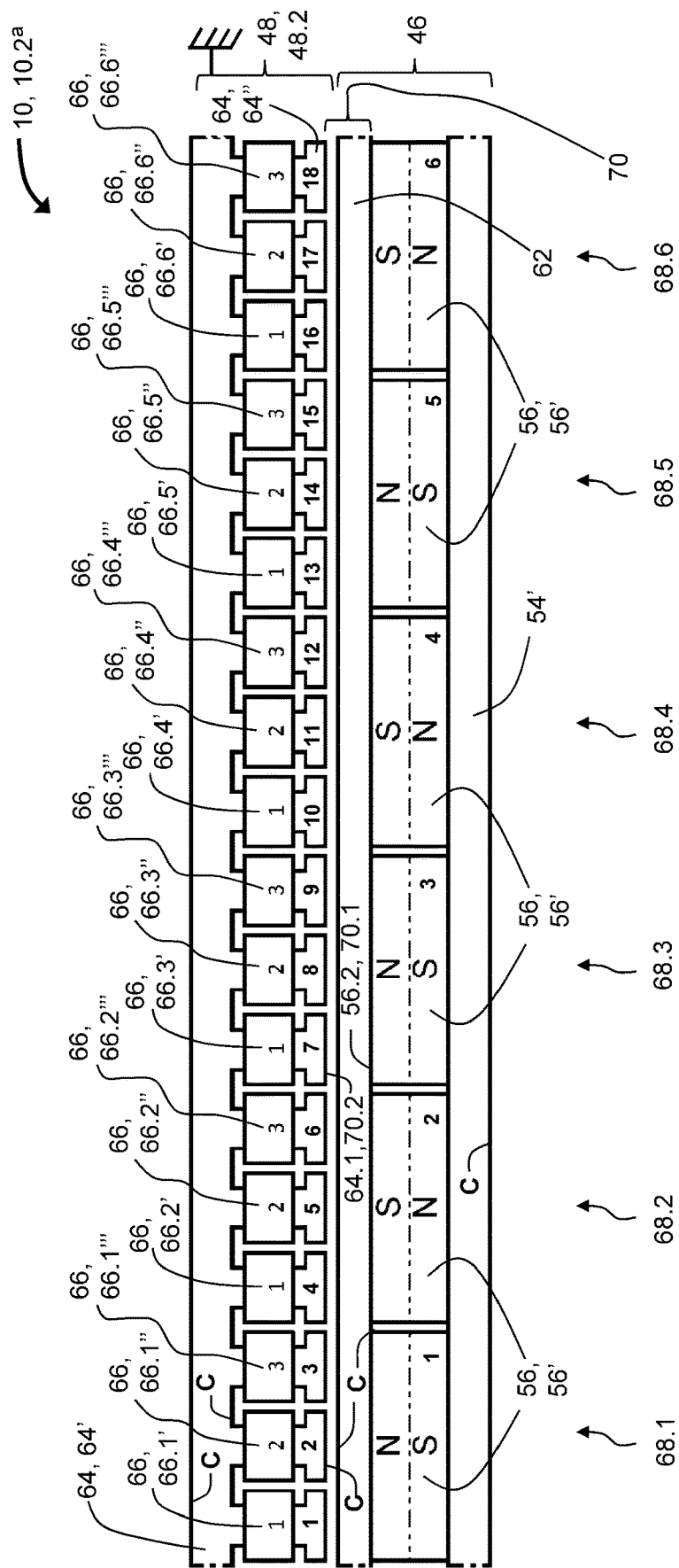
FIG. 8 illustrates a schematic 360-degree developed side view of a rotor and stator of a first embodiment of a three-phase shrouded-fan generator—viewed from the front of the associated turbofan gas-turbine engine—incorporating a second aspect of an associated stator portion that provides for generating a three-phase AC output.

The illustrated first-embodiment-single-phase shrouded-fan generator 10, 10.1$^a$ provides for generating three cycles of AC output per revolution of the rotor portion 46 of the shrouded-fan generator 10—or one cycle per revolution for every two poles 68—wherein FIGS. 7a-7d respectively illustrate successive relative positions of the rotor 46 and stator 48 portions, with the rotor portion 46 rotating in a clockwise direction CW relative to the stator portion 48, for one of those three cycles. For example, referring to FIG. 7a, in a first relative-rotational position, each permanent magnet 56, 56' is aligned with a corresponding like-numbered stator tooth 64", resulting in a first set of clockwise-circulating magnetic flux components 72.1, and a second set of counterclockwise-circulating magnetic flux components 72.2, that are each directed from the stator tooth 64" to the stator back-ring portion 64' in odd-numbered stator teeth 64" ("1", "3", "5"), and from the stator back-ring portion 64' to the stator tooth 64" in even-numbered stator teeth 64" ("2", "4", "6"), so that the direction of the combined magnetic flux 72 in the odd-numbered stator teeth 64" ("1", "3", "5") is from the stator tooth 64" to the stator back-ring portion 64', and the direction of the combined magnetic flux 72 in the even-numbered stator teeth 64" ("2", "4", "6") is from the stator back-ring portion 64' to the stator tooth 64", thereby causing the induced voltages in each of the stator windings/coils 66, 66.1, 66.2, 66.3, 66.4, 66.5, 66.6 connected in series to be additive and of a first electrical polarity. Furthermore, each of the clockwise-circulating 72.1 and counterclockwise-circulating 72.2 magnetic flux components each circulate through both the stator back-ring portion 64' and the magnetically-permeable rotor yoke 54, and an adjacent—but different for different magnetic flux components 72.1, 72.2—pair of associated permanent magnets 56, 56'. Referring to FIG. 7b, in a second relative-rotational position, with the rotor portion 46 rotated 30 degrees clockwise from the first relative-rotational position, with the permanent magnets 56, 56' located circumferentially midway between stator teeth 64", there is substantially no net magnetomotive force along a magnetic flux path through the laminated stator core 64, so that the resulting magnetic flux 72.3 is substantially limited to fringing between adjacent permanent magnets 56, 56', resulting in substantially no magnetic flux through the stator teeth 64" and stator back-ring portion 64', as a result of the magnetic flux 72.3 emanating from one permanent magnet 56, 56' crossing the effective airgap 70, traveling circumferentially across the bridging stator tooth 64" and crossing back across the effective airgap 70 to the adjacent permanent magnet 56, 56' Since the magnetic flux 72.3 into the stator tooth 64" is substantially the same as the magnetic flux 72.3 out, there is no net magnetic flux 72.3 through the stator tooth 64" that passes to the stator back-ring portion 64' and therefore there is no voltage generated by the associated stator winding/coil 66. Referring to FIG. 7c, in a third relative-rotational position, with the rotor portion 46 rotated 60 degrees clockwise from the first relative-rotational position, each permanent magnet 56, 56' is aligned with a corresponding next-numbered stator tooth 64"—i.e. the number "1" permanent magnet 56, 56' aligned with the number "2" stator tooth 64", the number "2" permanent magnet 56, 56' aligned with the number "3" stator tooth 64", and so on, wherein, for purposes of adjacency, a number "1" element (permanent magnet 56, 56' or stator tooth 64") corresponds to a pseudo-number "7" element, and a number "6" element corresponds to a pseudo-number "0" element. In the third relative-rotational position, a first set of clockwise-circulating magnetic flux components 72.1, and a second set of counterclockwise-circulating magnetic flux components 72.2, are each directed from the stator tooth 64" to the stator back-ring portion 64' in even-numbered stator teeth 64" ("2", "4", "6"), and from the stator back-ring portion 64' to the stator tooth 64" in odd-numbered stator teeth 64" ("1", "3", "5"), so that the direction of the combined magnetic flux 72 in the even-numbered stator teeth 64" ("2", "4", "6") is from the stator tooth 64" to the stator back-ring portion 64', and the direction of the combined magnetic flux 72 in the odd-numbered stator teeth 64" ("1", "3", "5") is from the stator back-ring portion 64' to the stator tooth 64", thereby causing the induced voltages in each of the stator windings/coils 66, 66.1, 66.2, 66.3, 66.4, 66.5, 66.6 connected in series to be additive and of a second electrical polarity that is opposite to the first electrical polarity associated with the first relative-rotational position. Referring to FIG. 7d, in a fourth relative-rotational position, with the rotor portion 46 rotated 90 degrees clockwise from the first relative-rotational position, with the permanent magnets 56, 56' located circumferentially midway between stator teeth 64", there is substantially no net magnetomotive force along a magnetic flux path through the laminated stator core 64, so that the resulting magnetic flux 72.3 is substantially limited to fringing between adjacent permanent magnets 56, 56', resulting is substantially no magnetic flux through the stator teeth 64" and stator back-ring portion 64'. If the rotor portion 46 is rotated an additional 30 degrees clockwise relative to the fourth relative-rotational position, the configuration of the rotor 46 and stator 48 portions will then be functionally equivalent to the configuration of the first relative-rotational position illustrated in FIG. 7a.

Figure 9:
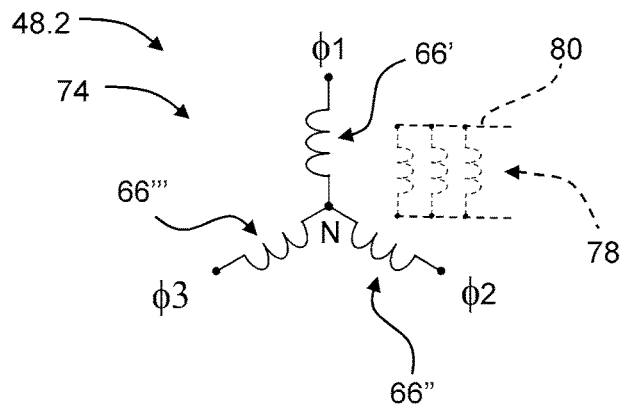
FIG. 9 illustrates a schematic diagram of a three-phase-wye connection of the stator-winding/coil phases of the second-aspect stator portion illustrated in FIG. 8, and a parallel connection of associated optional speed windings.
Figure 10A:
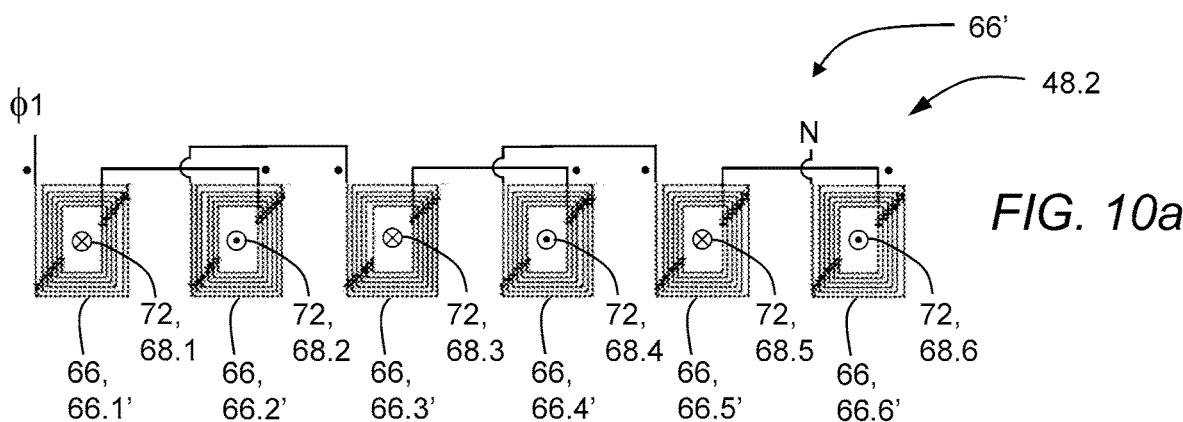
FIGS. 10a-10c illustrates respective embodiments of associated pluralities of stator coils connected in series, for each of the three phases of the second-aspect stator portion illustrated in FIGS. 8 and 9.
Figure 10B:
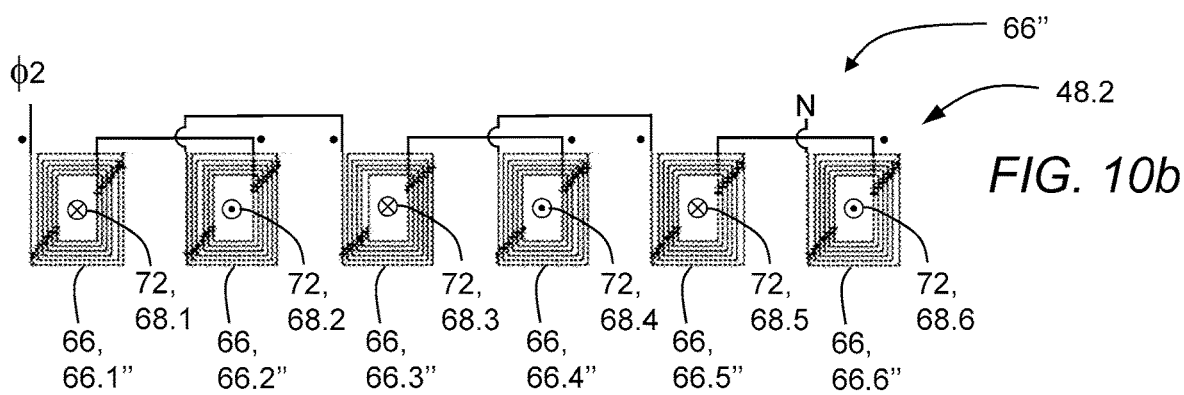
Figure 10C:
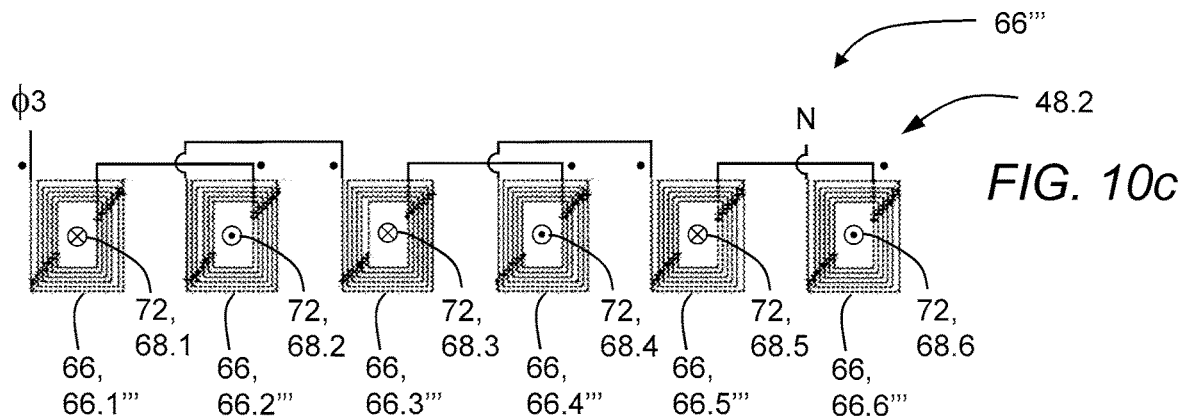

As another example, referring to FIGS. 8-10c, a first embodiment of a three-phase shrouded-fan generator 10, 10.2$^a$, incorporating a corresponding second aspect of an associated stator portion 48.2, that provides for generating a three-phase AC output, is the same as the above-described first-embodiment-single-phase shrouded-fan generator 10, 10.1$^a$, except that for each permanent magnet 56, 56', there is one stator tooth 64" for each phase of AC output. Accordingly, for a three-phase AC output, there are three phases φ1, φ2, φ3, each of which is provided by one of the three stator teeth 64", and a stator winding/coil 66 associated therewith, for each of the permanent magnets 56, 56' of the rotor portion 46 of the shrouded-fan generator 10. More particularly, a first phase of the three-phase AC output is generated by stator windings/coils 66, 66.1', 66.2', 66.3', 66.4', 66.5', 66.6', each labeled as "1", associated with corresponding stator teeth 64" labeled as "1", "4", "7", "10", "13", and "16". A second phase φ2 of the three-phase AC output is generated by stator windings/coils 66, 66.1", 66.2", 66.3", 66.4", 66.5", 66.6", each labeled as "2", associated with corresponding stator teeth 64" labeled as "2", "5", "8", "11", "14", and "17". Finally, a third phase φ3 of the three-phase AC output is generated by stator windings/coils 66, 66.1''', 66.2''', 66.3''', 66.5''', 66.6''', each labeled as "3", associated with corresponding stator teeth 64" labeled as "3", "6", "9", "12", "15", and "18". Each of the associated permanent magnets 56, 56' ("1", "2", "3", "4", "5", "6") defines a corresponding pole 68, 68.1, 68.2, 68.3, 68.4, 68.5, 68.6 of the illustrated embodiment of the first-embodiment-three-phase shrouded-fan generator 10, 10.2$^a$. Referring to FIGS. 9 and 10$a$, the six stator windings/coils 66, 66.1', 66.2', 66.3', 66.4', 66.5', 66.6' of the first phase φ1 are connected in series to form a corresponding first series stator windings/coils combination 66'—the same as for the above-described first-embodiment-single-phase shrouded-fan generator 10, 10.1$^a$, with the associated stator windings/coils 66, 66.1', 66.2', 66.3', 66.4', 66.5', 66.6' also oriented and polarized the same as for the above-described first-embodiment-single-phase shrouded-fan generator 10, 10.1$^a$. Referring to FIGS. 9 and 10$b$, the six stator windings/coils 66, 66.1", 66.2", 66.3", 66.4", 66.5", 66.6" of the second phase φ2 are connected in series to form a corresponding second series stator windings/coils combination 66"—the same as for the above-described first-embodiment-single-phase shrouded-fan generator 10, 10.1$^a$, with the associated stator windings/coils 66, 66.1", 66.2", 66.3", 66.4", 66.5", 66.6" also oriented and polarized the same as for the above-described first-embodiment-single-phase shrouded-fan generator 10, 10.1$^a$. Referring to FIGS. 9 and 10$c$, the six stator windings/coils 66, 66.1''', 66.2''', 66.3''', 66.4''', 66.5''', 66.6''' of the third phase φ3 are connected in series to form a corresponding third series stator windings/coils combination 66'''—the same as for the above-described first-embodiment-single-phase shrouded-fan generator 10, 10.1$^a$, with the associated stator windings/coils 66, 66.1''', 66.2''', 66.3''', 66.4''', 66.5''', 66.6''' also oriented and polarized the same as for the above-described first-embodiment-single-phase shrouded-fan generator 10, 10.1$^a$. The directions of magnetic flux 72 associated with each of the associated poles 68, 68.1, 68.2, 68.3, 68.4, 68.5, 68.6 indicated in FIGS. 10$a$, 10$b$ and 10$c$ are for respective rotational positions of the rotor portion 46 that are separated from one another by 20 degrees (360 degrees/18 stator teeth 64"), and the magnetic polarities associated with each of the stator windings/coils 66 reverses with every 60 degrees (360 degrees/6 poles 68) of rotation of the rotor portion 46.

Referring to FIG. 9, like-polarity terminals of the first 66', second 66", and third 66''' series stator windings/coils combinations are connected together to form a neutral node N of a three-phase-wye connection 74, with each of the first 66', second 66", and third 66''' series stator windings/coils combinations constituting corresponding legs of the three-phase-wye connection 74, the remaining terminals of which provide for the first φ1, second φ2, and third φ3 phase AC outputs of the first-embodiment-three-phase shrouded-fan generator 10, 10.2$^a$, wherein, for the illustrated embodiment, the resulting three-phase AC output exhibits three cycles per revolution (i.e. one cycle per revolution per phase for each pair of permanent magnets 56, 56' or poles 68) for each phase φ1, φ2, φ3—the same as for the first-embodiment-single-phase shrouded-fan generator 10, 10.1$^a$,—with the three phases φ1, φ2, φ3 offset by 120 degrees with respect to one another.

Figure 11:
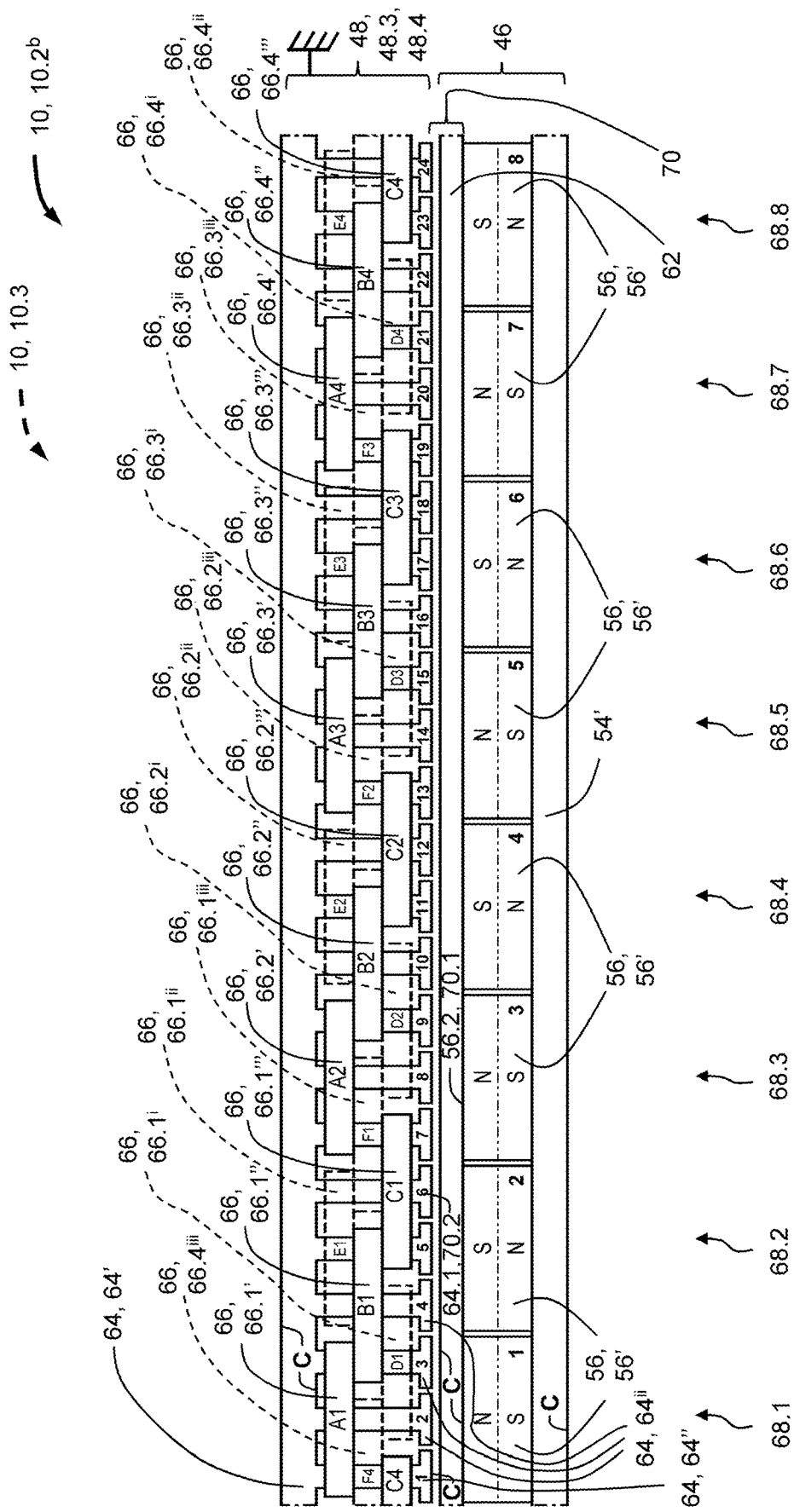
FIG. 11 illustrates a schematic 360-degree developed side view of a rotor and stator of a second embodiment of a three-phase shrouded-fan generator incorporating a third aspect of an associated stator portion that provides for generating a three-phase AC output, and an embodiment of six-phase shrouded-fan generator incorporating a fourth aspect of the associated stator portion that provides for generating a six-phase AC output, with both embodiments viewed from the front of the associated turbofan gas-turbine engine.
Figure 12:
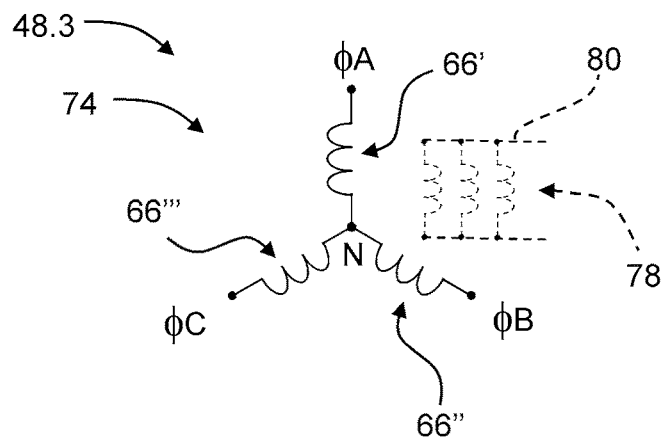
FIG. 12 illustrates a schematic diagram of a three-phase-wye connection of stator-winding/coil phases of the third-aspect stator portion illustrated in FIG. 11, and a parallel connection of associated optional speed windings.

As yet another example, referring to FIGS. 11-13$c$, a second embodiment of the three-phase shrouded-fan generator 10, 10.2$^b$ incorporating a corresponding third aspect of an associated stator portion 48.3, that provides for generating a three-phase AC output, is similar to the first-embodiment-three-phase shrouded-fan generator 10, 10.2$^a$, except that each of the stator windings/coils 66 spans three stator teeth 64" so as to span substantially the same effective angular circumferential distance as each of the associated permanent magnets 56, 56'. Furthermore, for each of the phases φA, φB, φB, the associated stator windings/coils 66 are circumferentially separated from one another by three stator teeth 64" that do not incorporate a stator winding/coil 66 for that particular phase φA, φB, φB, so that the resulting three-phase AC output exhibits one cycle per revolution per phase for either each pair of permanent magnets 56, 56'. Each of the associated permanent magnets 56, 56' ("1", "2", "3", "4", "5", "6", "7", "8") defines a corresponding pole 68, 68.1, 68.2, 68.3, 68.4, 68.5, 68.6, 68.7, 68.8 of the illustrated embodiment of the second-embodiment-three-phase shrouded-fan generator 10, 10.2$^b$.

More particularly, four stator windings/coils 66, 66.1', 66.2', 66.3', 66.4' are used to generate the first phase φA, wherein stator winding/coil A1, 66, 66.1' is wound around the group of stator teeth 64" that include "1", "2", and "3", stator winding/coil A2, 66, 66.2' is wound around the group of stator teeth 64" that include "7", "8", and "9", stator winding/coil A3, 66, 66.3' is wound around the group of stator teeth 64" that include "13", "14", and "15", and stator winding/coil A4, 66, 66.4' is wound around the group of stator teeth 64" that include "19", "20", and "21". Referring to FIGS. 12 and 13$a$, the four stator windings/coils 66, 66.1', 66.2', 66.3', 66.4' of the first phase φA, are connected in series to form a corresponding first series stator windings/coils combination 66' so as to provide for the voltages induced in the stator windings/coils 66, 66.1', 66.2', 66.3', 66.4' to reinforce one another for a like-directed magnetic flux 72 in each stator winding/coil 66, 66.1', 66.2', 66.3', 66.4', wherein the stator windings/coils 66, 66.1', 66.2', 66.3', 66.4' are spaced amongst the stator teeth 64" so as to receive like-phased and directed magnetic flux 72 at each rotational position of the rotor portion 46 of the shrouded-fan generator 10, 10.2$^b$.

Figure 13A:
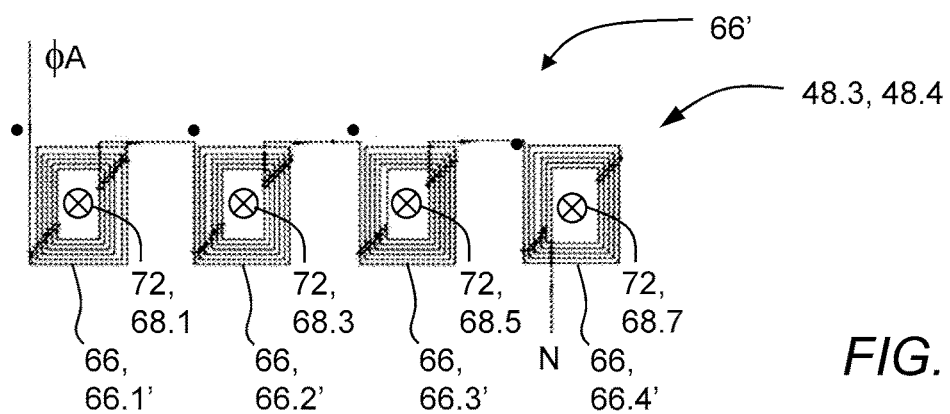
FIGS. 13a-13c illustrates respective embodiments of associated pluralities of stator coils connected in series, for each of the three phases of the third aspect stator portion, and three of the six phases of the fourth aspect stator portion, each of which are illustrated in FIG. 11.
Figure 13B:
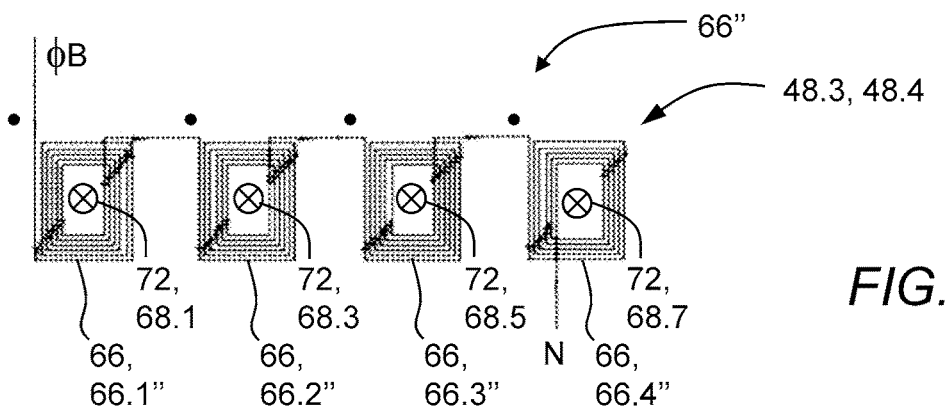

Another four stator windings/coils 66, 66.1", 66.2", 66.3", 66.4" are used to generate the second phase φB, wherein stator winding/coil B1, 66, 66.1" is wound around the group of stator teeth 64" that include "3", "4", and "5", stator winding/coil B2, 66, 66.2" is wound around the group of stator teeth 64" that include "9", "10", and "11", stator winding/coil B3, 66, 66.3" is wound around the group of stator teeth 64" that include "15", "16", and "17", and stator winding/coil B4, 66, 66.4" is wound around the group of stator teeth 64" that include "21", "22", and "23". Referring to FIGS. 12 and 13$b$, the four stator windings/coils 66, 66.1", 66.2", 66.3", 66.4" of the second phase φB, are connected in series to form a corresponding second series stator windings/coils combination 66' so as to provide for the voltages induced in the stator windings/coils 66, 66.1", 66.2", 66.3", 66.4" to reinforce one another for a like-directed magnetic flux 72 in each stator winding/coil 66, 66.1", 66.2", 66.3", 66.4", wherein the stator windings/coils 66, 66.1", 66.2", 66.3", 66.4" are spaced amongst the stator teeth 64" so as to receive like-phased and directed magnetic flux 72 at each rotational position of the rotor portion 46 of the shrouded-fan generator 10, 10.2$^b$, and the magnetic phasing illustrated in FIG. 13b corresponds to a rotational position of the rotor portion 46 that is offset clockwise—viewed from the front of the turbofan gas-turbine engine 12—30 degrees (360 degrees/(24 stator teeth 64"/2 stator teeth 64" offset)) relative to the rotational position used to illustrate FIG. 13a.

Figure 13C:
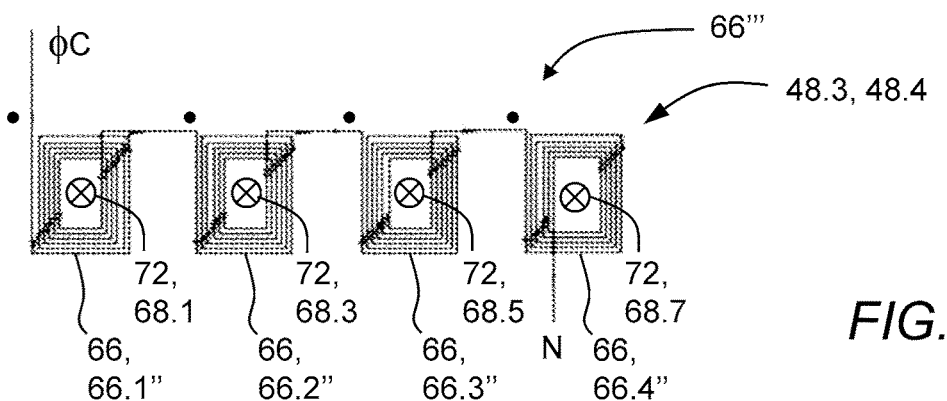

Yet another four stator windings/coils 66, 66.1''', 66.2''', 66.3''', 66.4''' are used to generate the third phase φC, wherein stator winding/coil C1, 66, 66.1''' is wound around the group of stator teeth 64" that include "5", "6", and "7", stator winding/coil C2, 66, 66.2''' is wound around the group of stator teeth 64" that include "11", "12", and "13", stator winding/coil C3, 66, 66.3''' is wound around the group of stator teeth 64" that include "17", "18", and "19", and stator winding/coil C4, 66, 66.4''' is wound around the group of stator teeth 64" that include "23", "24", and "1". Referring to FIGS. 12 and 13c, the four stator windings/coils 66, 66.1''', 66.2''', 66.3''', 66.4''' of the third phase φC, are connected in series to form a corresponding third series stator windings/coils combination 66''' so as to provide for the voltages induced in the stator windings/coils 66, 66.1''', 66.2''', 66.3''', 66.4''' to reinforce one another for a like-directed magnetic flux 72 in each stator winding/coil 66, 66.1''', 66.2''', 66.3''', 66.4''', wherein the stator windings/coils 66, 66.1''', 66.2''', 66.3''', 66.4''' are spaced amongst the stator teeth 64" so as to receive like-phased and directed magnetic flux 72 at each rotational position of the rotor portion 46 of the shrouded-fan generator 10, 10.2$^b$, and the magnetic phasing illustrated in FIG. 13c corresponds to rotational position of the rotor portion 46 that is offset clockwise—viewed from the front of the turbofan gas-turbine engine 12—30 degrees (360 degrees/(24 stator teeth 64"/2 stator teeth 64" offset)) relative to the rotational position used to illustrate FIG. 13b.

The magnetic polarities associated with each of the stator windings/coils 66 illustrated in FIGS. 13a, 13b and 13c reverses with every 45 degrees (360 degrees/8 poles 68) of rotation of the rotor portion 46 as a result of an association with a different set of poles 68. For example, with the rotor portion 46 rotated clockwise—viewed from the front of the turbofan gas-turbine engine 12—by 45 degrees, each of the stator windings/coils 66, 66.1', 66.2', 66.3', 66.4' illustrated in FIG. 13a, each of the stator windings/coils 66, 66.1", 66.2", 66.3", 66.4" illustrated in FIG. 13b, and each of the stator windings/coils 66, 66.1''', 66.2''', 66.3''', 66.4''' illustrated in FIG. 13c, would each be respectively associated with poles 68.8, 68.2, 68.4 and 68.6, with the associated magnetic flux 72 directed out of the page, rather than into the page.

Referring to FIG. 12, like-polarity terminals of the first 66', second 66", and third 66''' series stator windings/coils combinations are connected together to form a neutral node N of a three-phase-wye connection 74, with each of the first 66', second 66", and third 66''' series stator windings/coils combinations constituting corresponding legs of the three-phase-wye connection 74, the remaining terminals of which provide for the first φA, second φB, and third φC phase AC outputs of the second-embodiment-three-phase shrouded-fan generator 10, 10.2$^b$, wherein, for the illustrated embodiment, the resulting three-phase AC output exhibits three cycles per revolution (i.e. one cycle per revolution per phase for either each pair of permanent magnets 56, 56') for each phase φA, φB, φC, with the three phases φA, φB, φC offset by 120 degrees with respect to one another.

Figure 14:
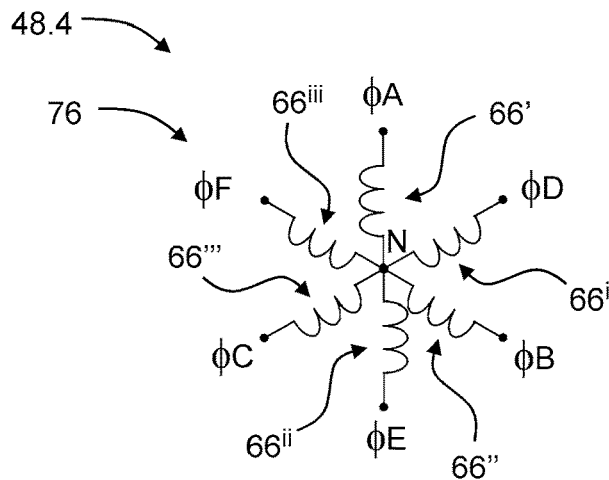
FIG. 14 illustrates a schematic diagram of a six-phase-wye connection of stator-winding/coil phases of the fourth aspect stator portion illustrated in FIG. 11.
Figure 15A:
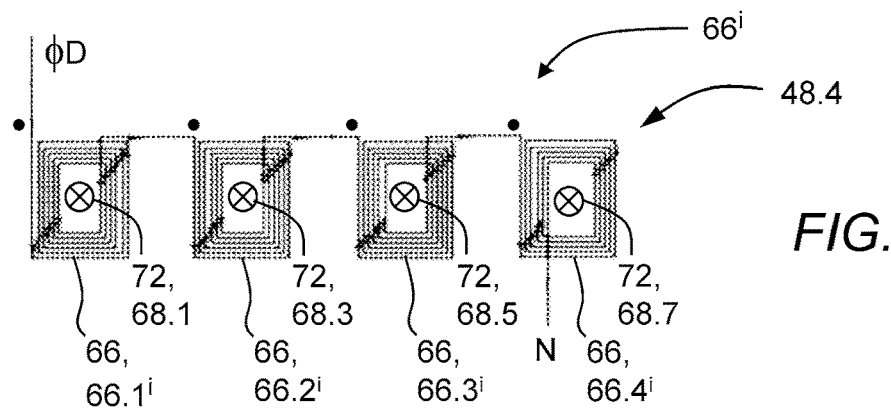
FIGS. 15a-15c illustrates respective embodiments of associated pluralities of stator coils connected in series, for each of three additional phases of the fourth aspect stator portion illustrated in FIGS. 11 and 14.
Figure 15B:
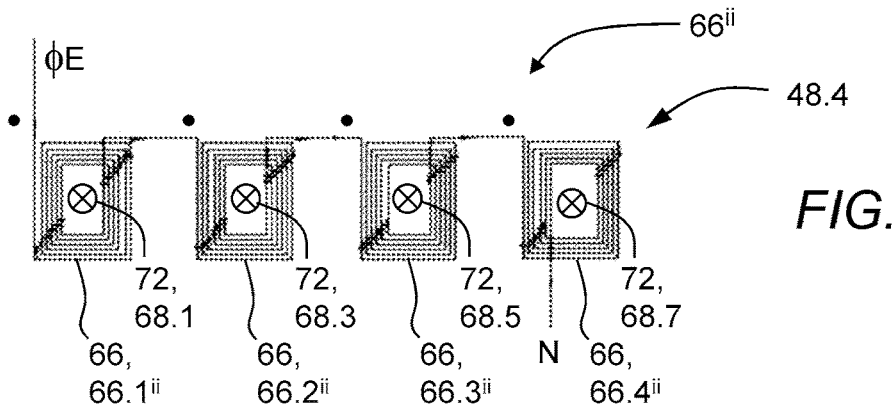
Figure 15C:
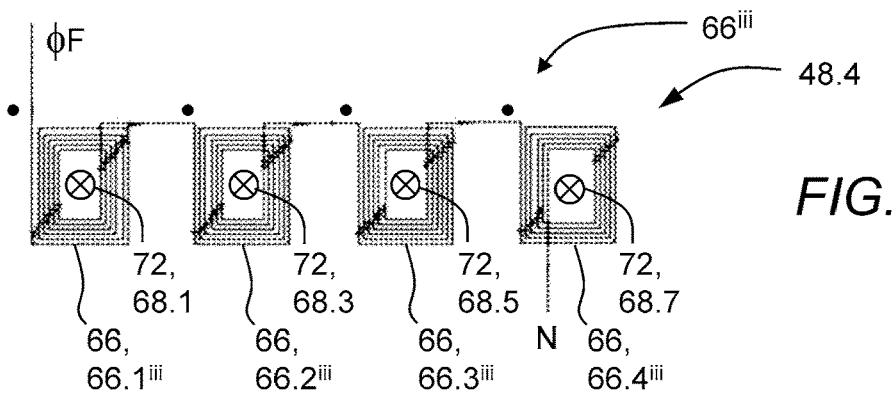

As yet another example, referring again to FIG. 11, and also to FIGS. 14-15c, a six-phase shrouded-fan generator 10, 10.3, —incorporating a corresponding fourth aspect of an associated stator portion 48.4 that provides for generating a six-phase AC output, —incorporates additional stator windings/coils 66 defining the fourth φD, fifth φE, and sixth φF phases, in cooperation with the elements of the above-described second-embodiment-three-phase shrouded-fan generator 10, 10.2$^b$.

More particularly, four stator windings/coils 66, 66.1$^i$, 66.2$^i$, 66.3$^i$, 66.4$^i$ are used to generate the fourth phase φD, wherein stator winding/coil D1, 66, 66.1$^i$ is wound around the group of stator teeth 64$^{ii}$ that include "2", "3", and "4", stator winding/coil D2, 66, 66.2$^i$ is wound around the group of stator teeth 64$^{ii}$ that include "8", "9", and "10", stator winding/coil D3, 66, 66.3$^i$ is wound around the group of stator teeth 64$^{ii}$ that include "14", "15", and "16", and stator winding/coil D4, 66, 66.4$^i$ is wound around the group of stator teeth 64$^{ii}$ that include "20", "21", and "22". Referring to FIGS. 14 and 15a, the four stator windings/coils 66, 66.1$^i$, 66.2$^i$, 66.3$^i$, 66.4$^i$ of the fourth phase φD, are connected in series to form a corresponding fourth series stator windings/coils combination 66$^i$ so as to provide for the voltages induced in the stator windings/coils 66, 66.1$^i$, 66.2$^1$, 66.3$^1$, 66.4$^i$ to reinforce one another for a like-directed magnetic flux 72 in each stator winding/coil 66, 66.1$^i$, 66.2$^i$, 66.3$^i$, 66.4$^i$, wherein the stator windings/coils 66, 66.1$^i$, 66.2$^i$, 66.3$^i$, 66.4$^i$ are spaced amongst the stator teeth 64" so as to receive like-phased and directed magnetic flux 72 at each rotational position of the rotor portion 46 of the shrouded-fan generator 10, 10.3, and the magnetic phasing illustrated in FIG. 15a corresponds to rotational position of the rotor portion 46 that is offset clockwise—viewed from the front of the turbofan gas-turbine engine 12—15 degrees (360 degrees/(24 stator teeth 64"/1 stator tooth 64" offset)), relative to the rotational position illustrated in FIG. 13a.

Another four stator windings/coils 66, 66.1$^{ii}$, 66.2$^{ii}$, 66.3$^{ii}$, 66.4$^{ii}$ are used to generate the fifth phase φE, wherein stator winding/coil E1, 66, 66.1$^{ii}$ is wound around the group of stator teeth 64$^{ii}$ that include "4", "5", and "6", stator winding/coil E2, 66, 66.2$^{ii}$ is wound around the group of stator teeth 64$^{ii}$ that include "10", "11", and "12", stator winding/coil E3, 66, 66.3$^{ii}$ is wound around the group of stator teeth 64$^{ii}$ that include "16", "17", and "18", and stator winding/coil E4, 66, 66.4$^{ii}$ is wound around the group of stator teeth 64$^{ii}$ that include "22", "23", and "24". Referring to FIGS. 14 and 15b, the four stator windings/coils 66, 66.1$^{ii}$, 66.2$^{ii}$, 66.3$^{ii}$, 66.4$^{ii}$ of the fifth phase φE, are connected in series to form a corresponding fifth series stator windings/coils combination 66$^{ii}$ so as to provide for the voltages induced in the stator windings/coils 66, 66.1$^{ii}$, 66.2$^{ii}$, 66.3$^{ii}$, 66.4$^{ii}$ to reinforce one another for a like-directed magnetic flux 72 in each stator winding/coil 66, 66.1$^{ii}$, 66.2$^{ii}$, 66.3$^{ii}$, 66.4$^{ii}$, wherein the stator windings/coils 66, 66.1$^{ii}$, 66.2$^{ii}$, 66.3$^{ii}$, 66.4$^{ii}$ are spaced amongst the stator teeth 64" so as to receive like-phased and directed magnetic flux 72 at each rotational position of the rotor portion 46 of the shrouded-fan generator 10, 10.2$^b$, and the magnetic phasing illustrated in FIG. 15b corresponds to rotational position of the rotor portion 46 that is offset clockwise—viewed from the front of the turbofan gas-turbine engine 12—30 degrees (360 degrees/

(24 stator teeth 64"/2 stator teeth 64" offset)) relative to the rotational position illustrated in FIG. 15*a*.

Yet another four stator windings/coils 66, 66.1$^{iii}$, 66.2$^{iii}$, 66.3$^{iii}$, 66.4$^{iii}$ are used to generate the sixth phase φF, wherein stator winding/coil F1, 66, 66.1$^{iii}$ is wound around the group of stator teeth 64$^{ii}$ that include "6", "7", and "8", stator winding/coil F2, 66, 66.2$^{iii}$ is wound around the group of stator teeth 64$^{ii}$ that include "12", "13", and "14", stator winding/coil F3, 66, 66.3$^{iii}$ is wound around the group of stator teeth 64$^{ii}$ that include "18", "19", and "20", and stator winding/coil F4, 66, 66.4$^{iii}$ is wound around the group of stator teeth 64$^{ii}$ that include "24", "1", and "2". Referring to FIGS. 14 and 15*c*, the four stator windings/coils 66, 66.1$^{iii}$, 66.2$^{iii}$, 66.3$^{iii}$, 66.4$^{iii}$ of the sixth phase φF, are connected in series to form a corresponding sixth series stator windings/coils combination 66$^{iii}$ so as to provide for the voltages induced in the stator windings/coils 66, 66.1$^{iii}$, 66.2$^{iii}$, 66.3$^{iii}$, 66.4$^{iii}$ to reinforce one another for a like-directed magnetic flux 72 in each stator winding/coil 66, 66.1$^{iii}$, 66.3$^{iii}$, 66.4$^{iii}$, wherein the stator windings/coils 66, 66.1$^{iii}$, 66.3$^{iii}$, 66.4$^{iii}$ are spaced amongst the stator teeth 64" so as to receive like-phased and directed magnetic flux 72 at each rotational position of the rotor portion 46 of the shrouded-fan generator 10, 10.2$^b$, and magnetic the phasing illustrated in FIG. 15*c* corresponds to rotational position of the rotor portion 46 that is offset clockwise—viewed from the front of the turbofan gas-turbine engine 12—30 degrees (360 degrees/(24 stator teeth 64"/2 stator teeth 64" offset)) relative to the rotational position illustrated in FIG. 15*b*.

Referring to FIG. 14, like-polarity terminals of the fourth 66$^i$, fifth 66$^{ii}$ and sixth 66$^{iii}$ series stator windings/coils combinations are also connected to the neutral node N of the three-phase-wye connection 74 previously described for the s second-embodiment-three-phase shrouded-fan generator 10, 10.2$^b$, so as to form an associated six-phase-wye connection 76, with each of the fourth 66$^i$, fifth 66$^{ii}$ and sixth 66$^{iii}$ series stator windings/coils combinations constituting corresponding legs of the six-phase-wye connection 76, the remaining terminals of which provide for the fourth φD, fifth φE, and sixth φF phase AC outputs of the six-phase shrouded-fan generator 10, 10.3, wherein, for the illustrated embodiment, the resulting six-phase AC output exhibits three cycles per revolution (i.e. one cycle per revolution per phase for either each pair of permanent magnets 56, 56') for each phase φA, φB, φC, φD, φE, and φF—the same as for the second-embodiment-three-phase shrouded-fan generator 10, 10.2$^b$,—with the six phases φA, φD, φB, φE, φC, and φF that are respectively offset by 60 degrees with respect to one another.

Referring to FIGS. 9 and 12, the shrouded-fan generator 10 may optionally also incorporate a set of one or more speed windings/coils 78 that are collocated with a corresponding one or more of the stator windings/coils 66 for a common phase, i.e. either the single phase of the first-embodiment-single-phase shrouded-fan generator 10, 10.1$^a$, or one of the phases φ1, φ2, φ3, φA, φB, φC, φD, φE, and φF of the three-phase 10.2$^a$, 10.2$^b$ or six-phase 10.3 shrouded-fan generators 10. For example, as illustrated in FIGS. 9 and 12, a plurality of speed windings/coils 78 may be connected in parallel to provide a rotational speed signal 80 that provides a measure of the rotational speed of the shrouded-fan generator 10, 10.1$^a$, 10.2$^a$, 10.2$^b$, 10.3.

Referring to FIGS. 16 and 17, a second embodiment of a single-phase shrouded-fan generator 10, 10.1$^b$—incorporating a corresponding fifth aspect of an associated stator portion 48.5 that provides for generating a single-phase AC output—is the same as the above-described first-embodiment-single-phase shrouded-fan generator 10, 10.1$^a$, except that the fifth-aspect stator portion 48.5 incorporates a stator winding/coil 66 around only every other stator tooth 64", which provides for each stator winding/coil 66 to fill a larger volume of the associated slots 82 that interleave the stator teeth 64". In both the first 10.1$^a$ and second 10.1$^b$ embodiments of the single-phase shrouded-fan generator, all the slots 82 between the stator teeth 64" are filled with stator windings/coils 66, however, in the first embodiment 10.1$^a$, each slot 82 accommodates portions of two different stator windings/coils 66 associated with both adjacent stator teeth 64", whereas in the second embodiment 10.1$^b$, each slot 82 accommodates a portions of only one stator winding/coil 66 associated with only one of the adjacent stator teeth 64". More particularly, both the first 10.1$^a$ and second 10.1$^b$ embodiments of the single-phase shrouded-fan generator incorporate the same number (six) and arrangement of poles 68, however the second-embodiment-single-phase shrouded-fan generator 10, 10.1$^b$ only incorporates stator windings/coils 66, 66.1, 66.3, 66.5 around corresponding odd-numbered stator teeth 64", i.e. numbered "1", "3" and "5". Every pair of circumferentially-adjacent stator windings/coils 66 are separated with a stator tooth 64" that does not incorporate a stator winding/coil 66. Accordingly, referring to FIG. 17, with the stator teeth 64" and poles 68 in one-to-one correspondence, each of the stator windings/coils 66 is exposed to like-phased magnetic flux 72, wherein, for the illustrated embodiment, the relative phases of the magnetic flux 72 illustrated in FIG. 17—i.e. into or out of the page—would reverse, from that illustrated, for every 60 degrees of rotation of the rotor portion 46 of the second-embodiment-single-phase shrouded-fan generator 10, 10.1$^b$. In the illustrated embodiment, the three stator windings/coils 66, 66.1, 66.3, 66.5 are connected in series with one another for maximum combined AC peak-to-peak output voltage, with the resulting AC output generated between associated terminals 73.1, 73.2 of the associated series network of stator windings/coils 66, 66.1, 66.3, 66.5.

The series connections of plural stator windings/coils 66 associated with each phase φ1, φ2, φ3, φA, φB, φC, φD, φE, and φF as illustrated in FIGS. 6, 10*a*-10*c*, 13*a*-13*c*, and 15*a*-15*c* provides for maximizing the associated level of peak-to-peak voltage of the associated AC output. Alternatively, the associated plural stator windings/coils 66 could be interconnected in parallel to provide for maximizing the associated peak-to-peak current of the associated AC output, or in a series-parallel network so as to provide for an intermediate level of peak-to-peak voltage or peak-to-peak of current. For example, the six stator windings/coils 66, (66.1, 66.2, 66.3, 66.4, 66.5, 66.6), (66.1', 66.2', 66.3', 66.4', 66.5', 66.6'), (66.1", 66.2", 66.3", 66.4", 66.5", 66.6"), or (66.1''', 66.2''', 66.3''', 66.4''', 66.5''', 66.6''') of the first-embodiment-single-phase shrouded-fan generator 10, 10.1$^a$, or of the first-embodiment-three-phase shrouded-fan generator 10, 10.2$^a$, could alternatively be connected as the parallel combination of three pairs of series-connected stator windings/coils 66; or the parallel combination of two sets of series-connected stator windings/coils 66, with each set of series-connected stator windings/coils 66 containing three stator windings/coils 66 connected in series. As another example, the four stator windings/coils 66, (66.1', 66.2', 66.3', 66.4'), (66.1", 66.2", 66.3", 66.4"), (66.1''', 66.2''', 66.3''', 66.4'''), (66.1$^i$, 66.2$^i$, 66.3$^i$, 66.4$^i$), (66.1$^{ii}$, 66.2$^{ii}$, 66.3$^{ii}$, (66.1$^{iii}$, 66.2$^{iii}$, 66.3$^{iii}$, 66.4$^{iii}$) of the second-embodiment-three-phase shrouded-fan generator 10, 10.2$^b$, or of the six-phase shrouded-fan generator 10, 10.3, could alternatively be connected as the parallel combination of two pairs of series-connected stator windings/coils 66.

It should be understood that the number of stator windings/coils 66 is not limiting, nor is the number of stator teeth 64″ in relation to the number of permanent magnets 56, 56′, nor the number of stator teeth 64″ encircled by each stator winding/coil 66. For example, alternatively, in one set of embodiments, there could be an odd number of stator windings/coils 66, with each stator winding/coil 66 providing for generating a corresponding separate phase of AC output.

It should also be understood that the shrouded-fan generator 10 is not limited in application to an inlet fan 15 of a turbofan gas-turbine engine 12, but alternatively, or additionally, could also be applied to a compressor of a gas-turbine engine—single-spool or multi-spool,—one or more stages of which are implemented with corresponding associated shrouded-rotor stages. Furthermore, the shrouded-fan generator 10 is not limited in application to gas turbine engines, that latter of which has been used herein to illustrate an example of a prime mover that provides a source of torque to drive the shrouded-fan generator 10. The shrouded-fan generator 10 could be driven by any type of prime mover, or by any source of torque and associated rotational power, including, but not limited to an engine, a turbine or a motor. Furthermore, the shrouded-fan generator 10 could alternatively be driven responsive to fluid power from a flow of either gas or liquid that interacts with the fan blades 16′, or more generally, the blades, of either a shrouded fan, a shrouded compressor, or a shrouded turbine, or more generally, of a shrouded bladed-rotor.

It should be understood that the numbers of permanent magnets 56, 56′, stator windings/coils 66, stator teeth 64″ and poles 68, phases ϕ1, ϕ2, ϕ3, ϕA, ϕB, ϕC, ϕD, ϕE, and ϕF is not limiting, and are not limited to what is illustrated in the above-described aspects and embodiments.

Referring again to FIG. 4, in accordance with one set of embodiments, the first-aspect shrouded-fan generator 10, 10$^i$ incorporates a magnetically-permeable rotor yoke 54 that does not incorporate a magnetically-permeable fan-retaining-ring 54″, wherein the magnetic reluctance of either, or both, a magnetically-permeable fan shroud 16‴, or an associated magnetically-permeable ring 54′, is sufficient to provide for electrical operation of the shrouded-fan generator 10, 10$^i$, but without sufficient associated hoop strength to mechanically retain the fan blades 16′, the fan shroud 16‴, and, if present, the magnetically-permeable ring 54′, at an expected maximum rotational speed, in which case the necessary hoop strength to mechanically retain the fan blades 16′, the magnetically-permeable rotor yoke 54, and the associated permanent magnets 56, 56′ is provided by the associated non-magnetic magnet-retaining-ring 62, the latter of which, for example, is constructed of a carbon-fiber composite or some other non-magnetic high-strength-to-weight-ratio material. The additional hoop strength necessary to retain the fan blades 16′ and the magnetically-permeable rotor yoke 54, relative to the hoop strength that would be necessary to only retain the associated permanent magnet 56, 56′, results in a relatively radially-thicker non-magnetic magnet-retaining-ring 62 than would be necessary to only retain the associated permanent magnet 56, 56′, which has the effect of relatively increasing the effective airgap 70 between the rotor 46 and stator 48 portions of the first-aspect shrouded-fan generator 10, 10′, thereby increasing the minimum magnetic reluctance of the associated magnetic circuits between the rotor 46 and stator 48 portions, which decreases the peak magnitudes of the associated magnetic flux 72, thereby decreasing the electrical output of the first-aspect shrouded-fan generator 10, 10$^i$ relative to that of a first-aspect shrouded-fan generator 10, 10$^i$ with a relatively-smaller effective airgap 70.

Figure 18:
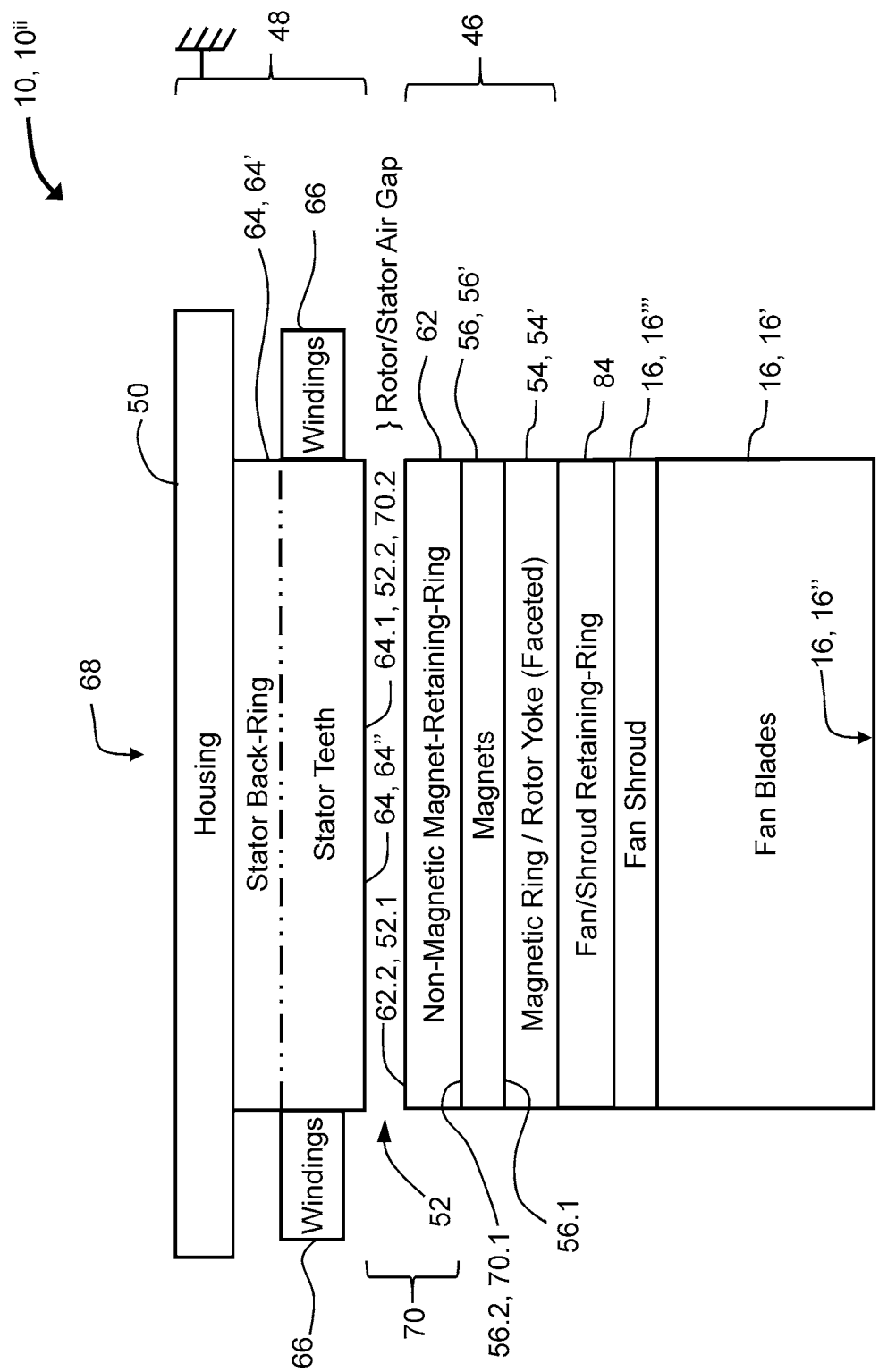
FIG. 18 illustrates a block diagram of the elements of a second aspect of a shrouded-fan generator.

Referring to FIG. 18, a second aspect 10, 10$^{ii}$ of a shrouded-fan generator 10, 10$^{ii}$ is similar to the above-described first-aspect shrouded-fan generator 10, 10$^i$, except for also incorporating an additional fan/shroud retaining-ring 84 encircling the fan shroud 16‴, wherein the fan/shroud retaining-ring 84 has sufficient hoop strength to provide for mechanically retaining the fan blades 16′ and the fan shroud 16‴ at the expected maximum rotational speed of the rotor portion 46 of the second-aspect shrouded-fan generator 10, 10$^{ii}$. The fan/shroud retaining-ring 84 is surrounded by a magnetically-permeable ring 54′ that provides for the associated magnetically-permeable rotor yoke 54 of the second-aspect shrouded-fan generator 10, 10$^{ii}$, wherein, in one set of embodiments, the magnetically-permeable ring 54′ has sufficient hoop strength to retain itself at the expected maximum rotational speed thereof. Accordingly, the non-magnetic magnet-retaining-ring 62 need only have sufficient hoop strength to retain the permanent magnets 56, 56′, and itself, at the expected maximum rotational speed thereof, which provides for minimizing the radial extent of the associated effective airgap 70, thereby providing for maximizing the electrical output of the second-aspect shrouded-fan generator 10, 10$^{ii}$. Alternatively, the magnetically-permeable ring 54′ could provide some capacity to also assist in retaining the fan blades 16′ and the fan shroud 16‴. Further alternatively, the non-magnetic magnet-retaining-ring 62 could provide some capacity to assist in retaining either the fan blades 16′ and fan shroud 16‴, or the magnetically-permeable ring 54′, or both. For example, in one set of embodiments, both the non-magnetic magnet-retaining-ring 62 and the fan/shroud retaining-ring 84 are constructed of a carbon-fiber composite or some other non-magnetic high-strength-to-weight-ratio material, and having a higher strength-to-weight-ratio than the material of the magnetically-permeable ring 54′, which provides for a relatively more compact second-aspect shrouded-fan generator 10, 10$^{ii}$ than would a first-aspect shrouded-fan generator 10, 10$^i$ incorporating a magnetically-permeable fan-retaining-ring 54″. The remaining aspects and features of the second-aspect shrouded-fan generator 10, 10$^{ii}$ are the same as for the above-described first-aspect shrouded-fan generator 10, 10$^i$.

Figure 19:
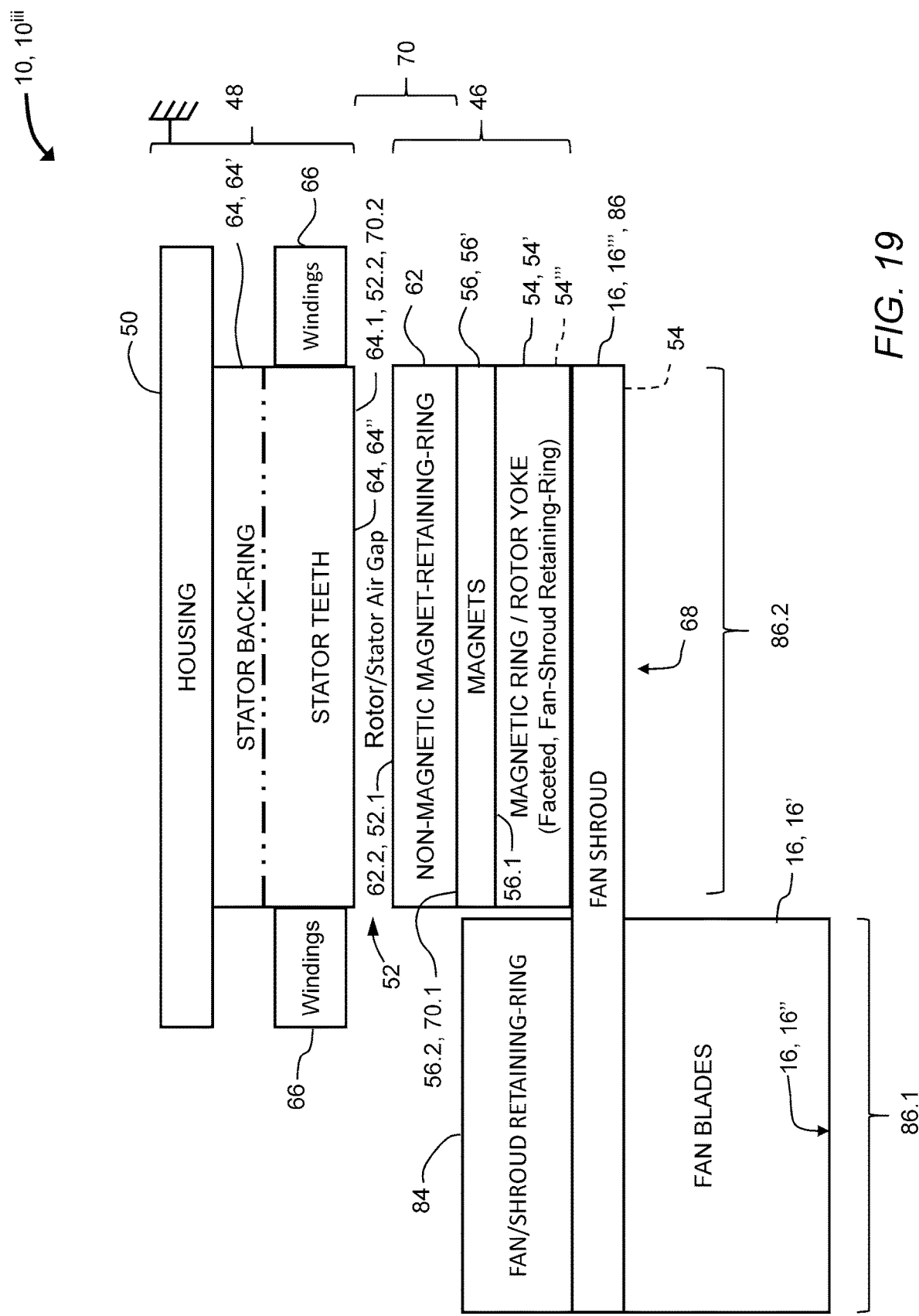
FIG. 19 illustrates a block diagram of the elements of a third aspect of a shrouded-fan generator.

Referring to FIG. 19, a third aspect 10, 10$^{iii}$ of a shrouded-fan generator 10, 10$^{iii}$ is similar to the above-described first-aspect shrouded-fan generator 10, 10$^i$, except for incorporating an axially-extended fan shroud 16‴, 86 that extends aftward of the associated fan blades 16′, with the remaining magnetic and electrical components of the third-aspect shrouded-fan generator 10, 10$^{iii}$ located aftward of the fan blades 16′—associated with an aftward portion 86.2 of the axially-extended fan shroud 16‴, 86—so that the associated centrifugal-force-loading of the fan blades 16′ is not applied either to the associated magnetically-permeable ring 54′, or to the non-magnetic magnet-retaining-ring 62, which provides for reducing the overall diameter of the third-aspect shrouded-fan generator 10, 10$^{iii}$ relative to that of either the first-aspect shrouded-fan generator 10, 10$^i$ or the second-aspect shrouded-fan generator 10, 10$^{ii}$. A fan/shroud retaining-ring 84—for example, constructed of a carbon-fiber composite or some other non-magnetic high-strength-to-weight-ratio material—is located around a forward portion 86.1 of the axially-extended fan shroud 16‴, 86 to provide for retaining the fan blades 16′ and the forward portion 86.1 of the axially-extended fan shroud 16‴, 86 at the expected maximum rotational speed thereof. Accordingly, the necessary hoop strength of the non-magnetic magnet-retaining-ring 62 is limited to that necessary to retain the permanent magnets 56, 56', and—to the extent not inherently provided for by the magnetically-permeable ring 54' or the aftward portion 86.2 of the axially-extended fan shroud 16''', 86—the magnetically-permeable ring 54' and/or the aftward portion 86.2 of the axially-extended fan shroud 16''', 86. The remaining aspects and features of the third-aspect shrouded-fan generator 10, 10$^{iii}$ are the same as for the above-described first-aspect shrouded-fan generator 10, 10$^i$. Alternatively, the third-aspect shrouded-fan generator 10, 10$^{iii}$ could incorporate either or both a magnetically-permeable fan-shroud-retaining-ring 54''' or a magnetically-permeable axially-extended fan shroud 16''', 86.

Figure 20:
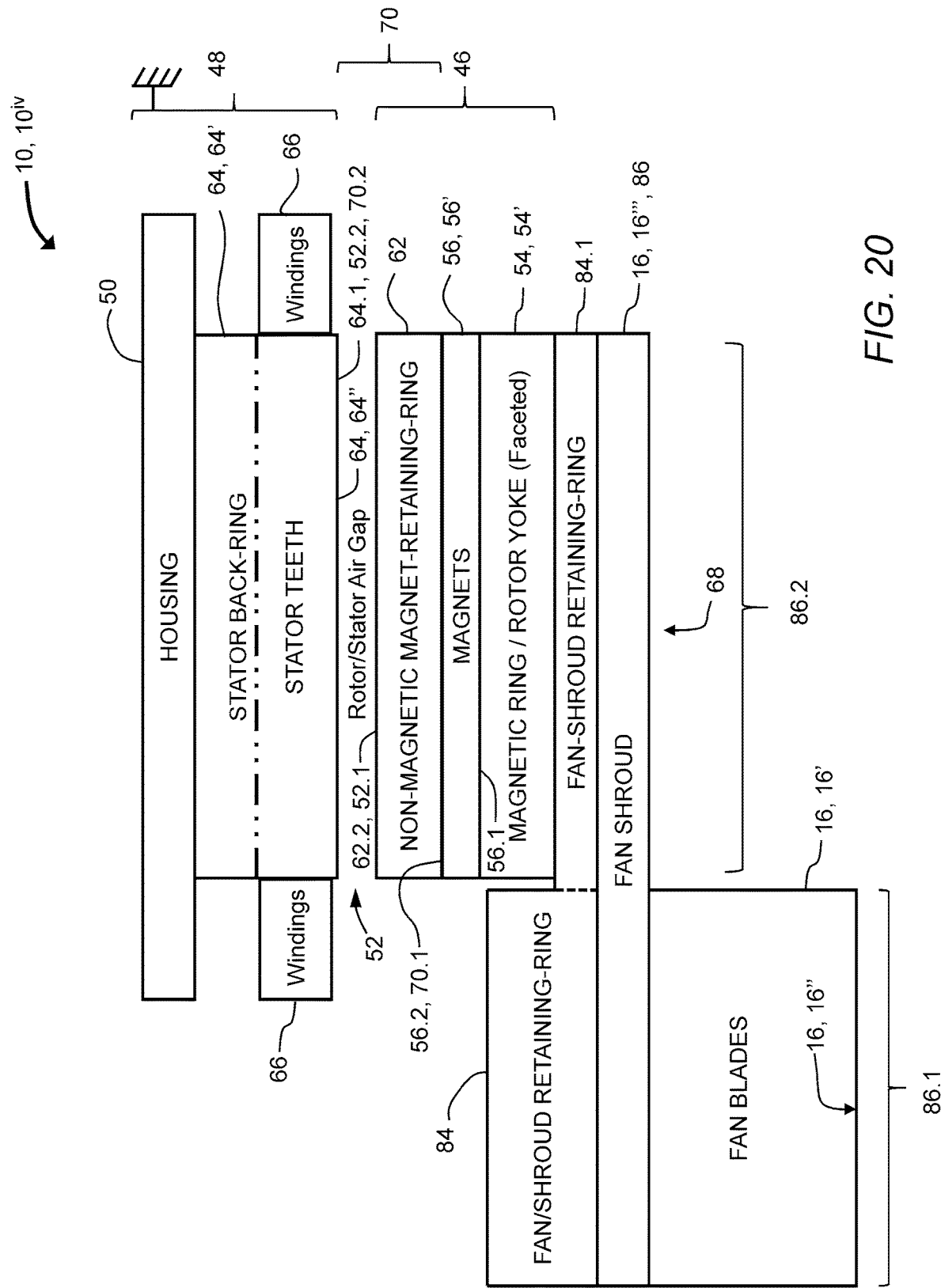
FIG. 20 illustrates a block diagram of the elements of a fourth aspect of a shrouded-fan generator.

Referring to FIG. 20, a fourth aspect 10, 10$^{iv}$ of a shrouded-fan generator 10, 10$^{iv}$ is similar to the above-described third-aspect shrouded-fan generator 10, 10$^{iii}$, except for also incorporating a fan-shroud retaining-ring 84.1 encircling the aftward portion 86.2 of the of the axially-extended fan shroud 16''', 86, within the magnetically-permeable ring 54', so as to provide for retaining the aftward portion 86.2 of the of the axially-extended fan shroud 16''' at the expected maximum rotational speed thereof, so as to provide for reducing the necessary hoop strength of the non-magnetic magnet-retaining-ring 62. The fan-shroud retaining-ring 84.1 can be constructed the same as the fan/shroud retaining-ring 84, either integral therewith or as a separate component.

Figure 21:
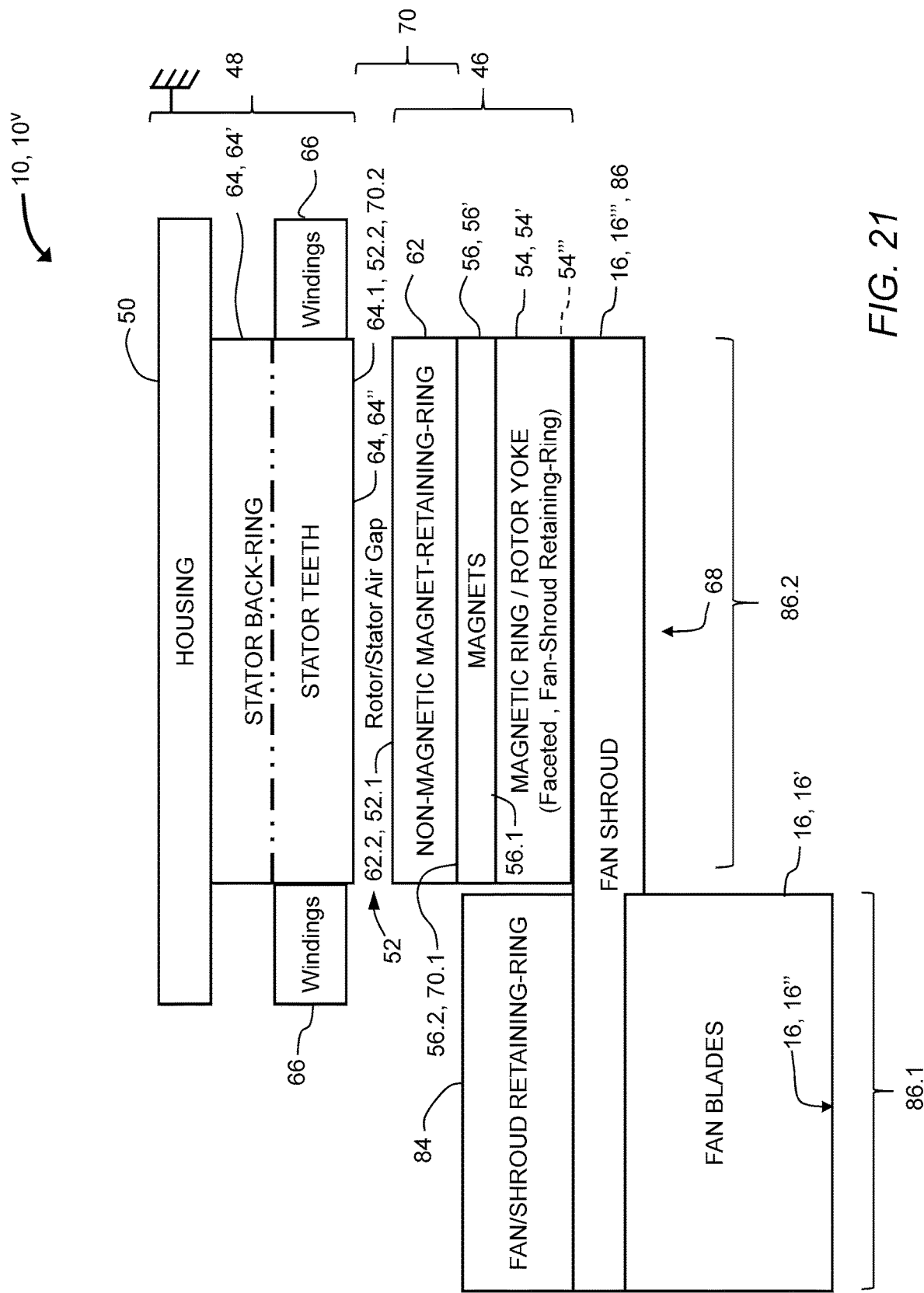
FIG. 21 illustrates a block diagram of the elements of a fifth aspect of a shrouded-fan generator.

Referring to FIG. 21, a fifth aspect 10, 10$^v$ of a shrouded-fan generator 10, 10$^v$ is similar to the above-described third-aspect shrouded-fan generator 10, 10$^{iii}$, except that the radial thickness of the aftward portion 86.2 of the axially-extended fan shroud 16''', 86 is extended—either radially-inwards as illustrated, or radially-outwards, relative to the forward portion 86.1—so as to provide for increasing the hoop strength thereof, so as to reduce or eliminate centrifugal-force-associated loading of the non-magnetic magnet-retaining-ring 62 by the aftward portion 86.2 of the axially-extended fan shroud 16''', 86 at the expected maximum rotational speed thereof, so as to provide for reducing the radial thickness of the associated effective airgap 70.

Figure 22:
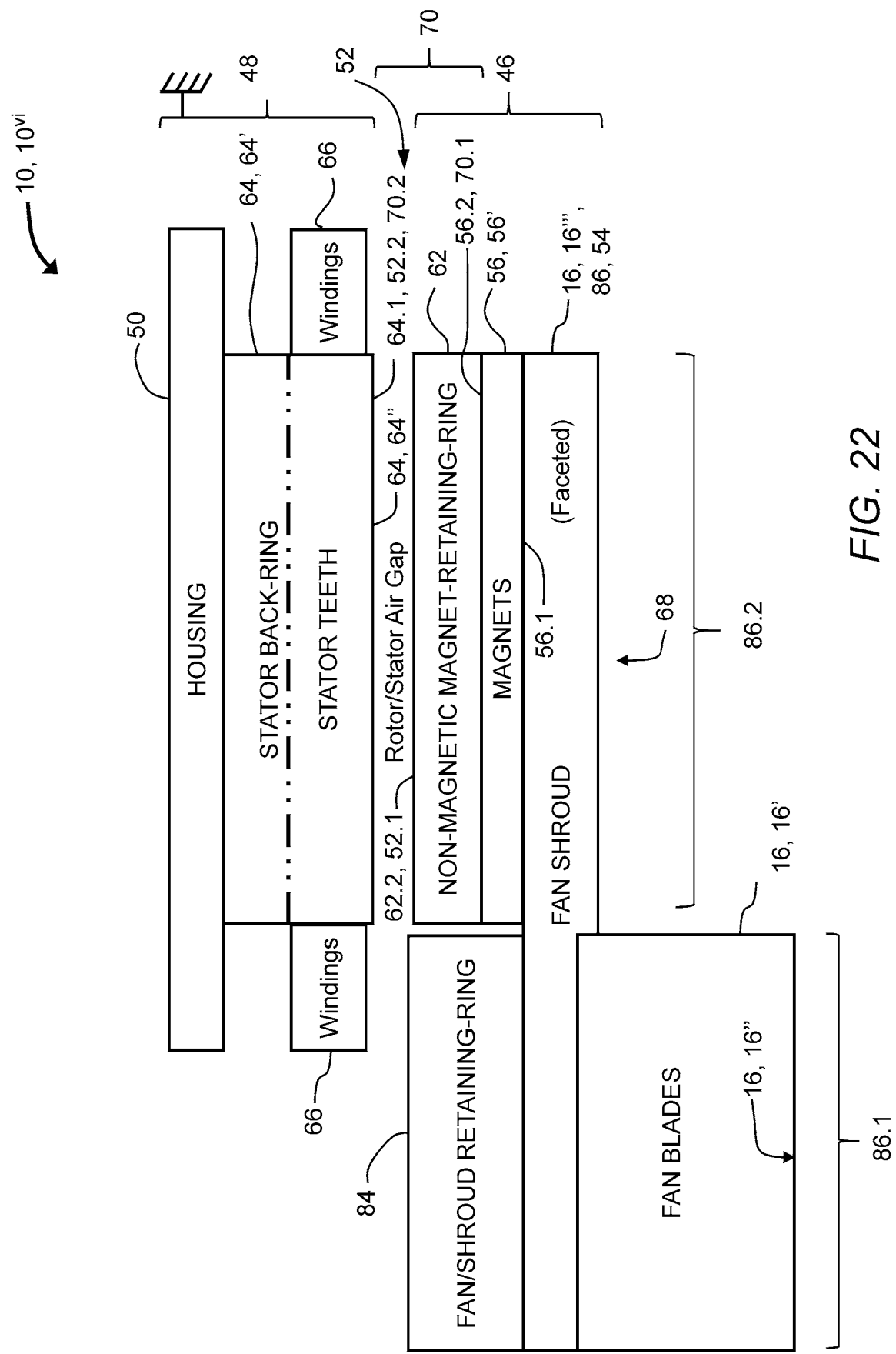
FIG. 22 illustrates a block diagram of the elements of a sixth aspect of a shrouded-fan generator.

Referring to FIG. 22, a sixth aspect 10, 10$^{vi}$ of a shrouded-fan generator 10, 10$^{vi}$ is similar to the above-described fifth-aspect shrouded-fan generator 10, 10$^v$, except that the aftward portion 86.2 of the axially-extended fan shroud 16''', 86 is magnetically permeable and solely constitutes the associated magnetically-permeable rotor yoke 54 of the sixth-aspect shrouded-fan generator 10, 10$^{vi}$, thereby precluding the need for a separate magnetically-permeable ring 54', wherein the radial thickness of the aftward portion 86.2 of the axially-extended fan shroud 16''', 86 is extended—either radially-inwards as illustrated, or radially-outwards, relative to the forward portion 86.1—so as to provide for increasing the hoop strength thereof, so as to reduce or eliminate centrifugal-force-associated loading of the non-magnetic magnet-retaining-ring 62 by the aftward portion 86.2 of the axially-extended fan shroud 16''', 86 at the expected maximum rotational speed thereof, so as to provide for reducing the radial thickness of the associated effective airgap 70.

Notwithstanding that the embodiments illustrated in FIGS. 19-22 are illustrated with an axially-extended fan shroud 16''', 86 for which the axially-extended portion constitutes an aftward portion 86.2 thereof—relative to the flow of air/gas through the associated fan blades 16',—it should be understood that, alternatively or additionally, the portion or portions of the axially-extended fan shroud 16''', 86 associated with the rotor portion 46 of the shrouded-fan generator 10 could be extended either forward, aftward, or both forward and aftward of the portion of the axially-extended fan shroud 16''', 86 that surrounds the fan blades 16'.

In practice, the particular aspect of the shrouded-fan generator 10$^i$, 10$^{ii}$, 10$^{iii}$, 10$^{iv}$, 10$^v$, 10$^{vi}$ and the associated configuration thereof would be selected based upon the desired or expected peripheral velocity of the fan shroud 16''', and the associated strengths of the materials that might be used for the associated fan shroud 16'''; axially-extended fan shroud 16', 86; magnetically-permeable fan-retaining-ring 54''; magnetically-permeable fan-shroud-retaining-ring 54'''; non-magnetic magnet-retaining-ring 62; fan/shroud retaining-ring 84; or fan-shroud retaining-ring 84.1, depending upon the configuration.

The location on the outside of the fan shroud 16''' of the shrouded-fan generator 10 is relatively cool, which provides for utilizing relatively less-expensive materials than would otherwise be required in a relatively hotter region of the turbofan gas-turbine engine 12. Furthermore, the location of the shrouded-fan generator 10 on the outside of the fan shroud 16''' also provides for the associated permanent magnets 56, 56' to operate at relatively high surface speeds, which provides for operating at relatively-high power density even with relatively-thin (i.e. relatively short in axial length) permanent magnets 56, 56'. Yet further, the location of the shrouded-fan generator 10 on the outside of the fan shroud 16''' also provides for all of the associated wiring to the stator portion 48 of the shrouded-fan generator 10 to be located outside the flow-path of the turbofan gas-turbine engine 12, so as to preclude a need for passing wires thereacross, for example, through associated struts. Yet further, referring again to FIG. 1, the location on the outside of the fan shroud 16''' of the shrouded-fan generator 10 does not require a relatively-increased bearing span distance 42 because the shrouded-fan generator 10 occupies existing axial space within the turbofan gas-turbine engine 12, which provides for not adversely affecting (i.e. lowering) the associated critical frequency—which is inversely related to the square of the associated bearing span distance 42—of the associated low-pressure spool 36.

The magnetic permeability $\mu$ of a material is given by the product $\mu_0 \cdot \mu_r$, wherein $\mu_0$ is the magnetic permeability of vacuum—which is $1.257 \cdot 10^{-6}$ Henries per meter,—and is $\mu_r$ referred to a relative permeability. Non-magnetic materials—for example, aluminum, Inconel® 718, titanium and 300 series stainless steels—have a value of relative permeability $\mu_r$, close to unity. As used herein, a non-magnetic material is defined to be a material with a relative permeability having a value less than 1.5.

Materials having a relatively-high value of magnetic permeability usually contain iron—for example, soft iron such as either 1018 steel or 1020 steel in the annealed state, which can have a relative permeability having a value in excess of 1000,—and sometimes contain special alloys. Magnetic permeability can vary considerably due to the operating point or the applied magnetic force. Although magnetic permeability decreases at higher magnetizing forces, the material can generally still be used provided that saturation does not occur. As used herein, a magnetically-permeable material is defined to have a value of relative permeability $\mu_r$ greater than 1000, examples of which include, but are not limited to, 3% Silicon steel for the laminations, 1018 steel, 4340 steel with a special heat treat to obtain high permeability, and some high strength. 400 series steels.

While specific embodiments have been described in detail in the foregoing detailed description and illustrated in the accompanying drawings, those with ordinary skill in the art will appreciate that various modifications and alternatives to those details could be developed in light of the overall teachings of the disclosure. It should be understood, that any reference herein to the term "or" is intended to mean an "inclusive or" or what is also known as a "logical OR", wherein when used as a logic statement, the expression "A or B" is true if either A or B is true, or if both A and B are true, and when used as a list of elements, the expression "A, B or C" is intended to include all combinations of the elements recited in the expression, for example, any of the elements selected from the group consisting of A, B, C, (A, B), (A, C), (B, C), and (A, B, C); and so on if additional elements are listed. Furthermore, it should also be understood that the indefinite articles "a" or "an", and the corresponding associated definite articles "the" or "said", are each intended to mean one or more unless otherwise stated, implied, or physically impossible. Yet further, it should be understood that the expressions "at least one of A and B, etc.", "at least one of A or B, etc.", "selected from A and B, etc." and "selected from A or B, etc." are each intended to mean either any recited element individually or any combination of two or more elements, for example, any of the elements from the group consisting of "A", "B", and "A AND B together", etc. Yet further, it should be understood that the expressions "one of A and B, etc." and "one of A or B, etc." are each intended to mean any of the recited elements individually alone, for example, either A alone or B alone, etc., but not A AND B together. Furthermore, it should also be understood that unless indicated otherwise or unless physically impossible, that the above-described embodiments and aspects can be used in combination with one another and are not mutually exclusive. Accordingly, the particular arrangements disclosed are meant to be illustrative only and not limiting as to the scope of the invention, which is to be given the full breadth of the appended claims, and any and all equivalents thereof.

What is claimed is:

1. A rotor of an electrical generator, comprising:
   a. a shrouded bladed-rotor configured to rotate about an axis of rotation, wherein said shrouded bladed-rotor incorporates:
      i. a plurality of blades, and
      ii. an annular magnetically-permeable rotor yoke concentric with said axis of rotation, wherein said annular magnetically-permeable rotor yoke comprises at least one element selected from the group consisting of a shroud of said shrouded bladed-rotor, and a ring of magnetically-permeable material encircling an axial portion of said shroud, wherein said plurality of blades are at least partially located within said shroud;
   b. an even-numbered plurality of permanent magnets operatively coupled to an outer surface of said annular magnetically-permeable rotor yoke, wherein said plurality of permanent magnets are oriented so that each North-South axis of each permanent magnet of said plurality of permanent magnets is substantially radially oriented with respect to said axis of rotation, and the North-South orientations of every pair of circumferentially-adjacent permanent magnets of said plurality of permanent magnets are opposite to one another; and
   c. a first retaining ring encircling said plurality of permanent magnets, wherein said first retaining ring is non-magnetic, and said first retaining ring has a hoop strength that is predetermined to retain said plurality of permanent magnets on said annular magnetically-permeable rotor yoke in reaction to centrifugal forces acting on said plurality of permanent magnets during operation of the rotor.

2. A rotor of an electrical generator as recited in claim 1, wherein said shroud is magnetically permeable.

3. A rotor of an electrical generator as recited in claim 1, further comprising at least one second retaining ring encircling at least one axial portion of said shroud, wherein said at least one second retaining ring abuts said shroud, and said at least one second retaining ring provides for retaining at least one of the group selected from said plurality of blades and said shroud, in reaction to associated centrifugal forces acting on said plurality of blades and said shroud during operation of said rotor.

4. A rotor of an electrical generator as recited in claim 3, wherein said at least one second retaining ring comprises a composite of carbon fiber and epoxy.

5. A rotor of an electrical generator as recited in claim 4, wherein said annular magnetically-permeable rotor yoke comprises said ring of magnetically-permeable material encircling said axial portion of said shroud, and said ring of magnetically-permeable material encircles at least one axial portion of said at least one second retaining ring encircling said at least one axial portion of said shroud.

6. A rotor of an electrical generator as recited in claim 1, wherein said annular magnetically-permeable rotor yoke comprises said ring of magnetically-permeable material encircling said axial portion of said shroud.

7. A rotor of an electrical generator as recited in claim 6, wherein said ring of magnetically-permeable material provides for retaining at least one of said plurality of blades and said shroud in reaction to associated centrifugal forces acting on said plurality of blades and said shroud during operation of said rotor.

8. A rotor of an electrical generator as recited in claim 6, wherein said axial portion of said shroud encircled by said ring of magnetically-permeable material encircles at least a portion of an axial portion of said shroud that encircles said plurality of blades.

9. A rotor of an electrical generator as recited in claim 1, wherein an axial extension of said shroud extends axially beyond an axial location of said plurality of blades, and both said plurality of permanent magnets and said first retaining ring are located around said axial extension of said shroud.

10. A rotor of an electrical generator as recited in claim 9, wherein said annular magnetically-permeable rotor yoke comprises said ring of magnetically-permeable material encircling said axial portion of said shroud, and said ring of magnetically-permeable material encircles said axial extension of said shroud.

11. A rotor of an electrical generator as recited in claim 9, wherein said shroud is magnetically permeable, and said plurality of permanent magnets abut said axial extension of said shroud.

12. A rotor of an electrical generator as recited in claim 9, further comprising at least one second retaining ring encircling at least one axial portion of said shroud that encircles said plurality of blades.

13. A rotor of an electrical generator as recited in claim 9, wherein an annular thickness of said axial extension of said shroud is greater than an annular thickness of a portion of said shroud encircling said plurality of blades.

14. A rotor of an electrical generator as recited in claim 1, wherein a radially-outermost portion of each blade of said plurality of blades is operatively coupled to said shroud.

15. A rotor of an electrical generator as recited in claim 14, wherein said plurality of blades are integral with said shroud.

16. A rotor of an electrical generator as recited in claim 1, wherein said shroud is shrink-fitted over the tips of said plurality of blades.

17. A rotor of an electrical generator as recited in claim 1, wherein said annular magnetically-permeable rotor yoke is shrink-fitted over said shroud.

18. A rotor of an electrical generator as recited in claim 1, wherein at least one of said shroud and said ring of magnetically-permeable material encircling said shroud is constructed of either 4140-alloy steel or 4340-alloy steel.

19. A rotor of an electrical generator as recited in claim 1, wherein said shrouded bladed-rotor further incorporates a central hub operatively coupled to a central portion of each of said plurality of blades.

20. A rotor of an electrical generator as recited in claim 1, wherein said plurality of permanent magnets are uniformly azimuthally spaced with respect to one another about said axis of rotation.

21. A rotor of an electrical generator as recited in claim 1, wherein an outside surface of said annular magnetically-permeable rotor yoke incorporates a plurality of planar facets in correspondence with said plurality of permanent magnets, and each planar facet of said plurality of planar facets is adapted to receive a corresponding planar face of a corresponding said permanent magnet of said plurality of permanent magnets.

22. A rotor of an electrical generator as recited in claim 1, wherein an outwardly-facing surface of each said permanent magnet of said plurality of permanent magnets is shaped so as to substantially conform to a underlying cylindrical surface that is concentric with said axis of rotation.

23. A rotor of an electrical generator as recited in claim 1, wherein said first retaining ring comprises a composite of carbon fiber and epoxy.

24. A rotor of an electrical generator as recited in claim 1, wherein said first retaining ring comprises either Inconel 718 or titanium.

25. A rotor of an electrical generator as recited in claim 1, further comprising at least one portion of at least one labyrinth seal depending from either or both said shroud or said ring of magnetically-permeable material.

26. A rotor of an electrical generator as recited in claim 1, wherein said rotor is configured to function as an inlet fan of a turbofan gas turbine engine.

27. A rotor of an electrical generator as recited in claim 1, wherein said rotor is configured to function as a compressor of a gas turbine engine.

28. A rotor of an electrical generator as recited in claim 1, wherein said rotor is incorporated in a gas-turbine engine, further comprising a stator of said electrical generator, wherein said stator comprises:
  a. a magnetically-permeable laminated stator core, wherein said magnetically-permeable laminated stator core comprises:
    i. an outer-ring portion, and
    ii. a plurality of stator teeth extending radially inward from said outer-ring portion; and
  b. a plurality of conductive windings-or-coils, wherein each conductive winding-or-coil of said plurality of conductive windings-or-coils is located around at least one stator tooth of said plurality of stator teeth, wherein said plurality of conductive windings-or-coils are electrically connected so as to generate one or more electrical outputs from the electrical generator.

29. A rotor of an electrical generator as recited in claim 28, wherein a quantity of said plurality of stator teeth is an integral multiple of a quantity of said plurality of permanent magnets.

30. A rotor of an electrical generator as recited in claim 28, wherein said plurality of stator teeth are uniformly azimuthally spaced with respect to one another about said axis of rotation.

31. A rotor of an electrical generator as recited in claim 28, wherein for a set of said conductive windings-or-coils of said plurality of conductive windings-or-coils associated with either a single phase or one of a plurality of phases, a quantity of said conductive windings-or-coils in said set of said conductive windings-or-coils is an integral multiple of a quantity of said plurality of permanent magnets, or said quantity of said plurality of permanent magnets is an integral multiple of said quantity of said conductive windings-or-coils in said set of said conductive windings-or-coils.

32. A rotor of an electrical generator as recited in claim 28, wherein said plurality of conductive windings-or-coils include a plurality of like-phase said conductive windings-or-coils, and said plurality of like-phase said conductive windings-or-coils are uniformly azimuthally spaced with respect to one another about said axis of rotation.

33. A rotor of an electrical generator as recited in claim 28, wherein at least two like-phase said conductive windings-or-coils of said plurality of conductive windings-or-coils are electrically connected in series.

34. A rotor of an electrical generator as recited in claim 28, wherein at least two like-phase said conductive windings-or-coils of said plurality of conductive windings-or-coils are electrically connected in parallel.

35. A rotor of an electrical generator as recited in claim 28, wherein a combination of a quantity of said plurality of conductive windings-or-coils, a quantity of said plurality of stator teeth, and locations of said plurality of conductive windings-or-coils relative to said plurality of stator teeth, in relation to a quantity of said plurality of permanent magnets, provides for generating a multi-phase electrical output from said electrical generator.

36. A method of generating electrical power from a gas turbine engine, comprising:
  a. rotating a shrouded bladed-rotor of a gas turbine engine, wherein said shrouded bladed-rotor provides for pumping a gaseous fluid into or through said gas turbine engine;
  b. generating a plurality of radially-directed magnetic flux components with a plurality of permanent magnets operatively coupled to an outermost surface either a shroud of said shrouded bladed-rotor or a magnetically-permeable ring operatively coupled to an outside surface of said shroud, wherein said plurality of permanent magnets are circumferentially-separated from one another around said outermost surface, each permanent magnet of said plurality of permanent magnets generates a corresponding radially-directed magnetic field component of said plurality of radially-directed magnetic flux components, and said plurality of permanent magnets are oriented so that circumferentially-adjacent said radially-directed magnetic flux components from corresponding circumferentially-adjacent said permanent magnets are in opposite radial directions;

c. physically retaining said plurality of permanent magnets on said outermost surface with a nonmagnetic retaining-ring encircling said plurality of permanent magnets;
d. magnetically conducting said plurality of radially-directed magnetic flux components through at least one of said shroud or said magnetically-permeable ring;
e. magnetically conducting said plurality of radially-directed magnetic flux components through at least portions of a fixed laminated stator core of a stator encircling said shrouded bladed-rotor, wherein said fixed laminated stator core comprises an outer continuous ring portion and a plurality of stator teeth, each stator tooth of said plurality of stator teeth extends radially inwards from said outer continuous ring portion, and a quantity of said plurality of stator teeth is an integral multiple of a quantity of said plurality of permanent magnets; and
f. generating at least one electrical power signal from a plurality of conductive windings-or-coils, wherein each conductive winding-or-coil of said plurality of conductive windings-or-coils encircles at least one stator tooth of said plurality of stator teeth, and said plurality of conductive windings-or-coils are circumferentially distributed amongst said plurality of stator teeth.

* * * * *